(12) United States Patent
Sasaoka

(10) Patent No.: US 6,540,031 B1
(45) Date of Patent: Apr. 1, 2003

(54) SMALL-SIZED TILLER

(75) Inventor: Masayuki Sasaoka, Wako (JP)

(73) Assignee: Honda Giken Kogyo Kabishiki Kaisha (JP)

( * ) Notice: Subject to any disclaimer, the term of this patent is extended or adjusted under 35 U.S.C. 154(b) by 0 days.

(21) Appl. No.: 09/633,904

(22) Filed: Aug. 7, 2000

(30) Foreign Application Priority Data

| Aug. 9, 1999 | (JP) | 11-225801 |
| Mar. 16, 2000 | (JP) | 2000-073729 |
| Feb. 16, 2000 | (JP) | 2000-038608 |

(51) Int. Cl.⁷ ............................................. A01B 33/00
(52) U.S. Cl. ........................ 172/42; 172/351; 172/365
(58) Field of Search ........................ 172/42, 44, 48, 172/329, 351, 365, 40; 56/16.7

(56) References Cited

U.S. PATENT DOCUMENTS

| 4,015,407 A | * | 4/1977 | Bacon | 56/255 |
| 4,224,996 A | * | 9/1980 | Dobberpuhl | 172/42 |
| 4,256,183 A | * | 3/1981 | Hanley | 172/42 |
| 4,286,670 A | * | 9/1981 | Ackerman | 172/42 |
| 4,392,538 A | * | 7/1983 | Goertzen | 180/19 R |
| 4,396,067 A | * | 8/1983 | Enters et al. | 172/42 |
| 4,402,366 A | * | 9/1983 | Dankel | 172/43 |
| 4,867,244 A | * | 9/1989 | Cozine et al. | 172/22 |
| 4,926,947 A | * | 5/1990 | Cozine et al. | 172/22 |
| 5,197,551 A | * | 3/1993 | Farley | 172/42 |
| 5,398,767 A | * | 3/1995 | Warke | 172/42 |
| 5,516,126 A | * | 5/1996 | Myers | 280/14.28 |
| 5,896,931 A | * | 4/1999 | Roberts et al. | 172/42 |

FOREIGN PATENT DOCUMENTS

JP 57086502 12/1982

* cited by examiner

*Primary Examiner*—Thomas B. Will
*Assistant Examiner*—Nathan Mammen
(74) *Attorney, Agent, or Firm*—Adams & Wilks

(57) ABSTRACT

A tiller has rotational blades for tilling the ground. A power source generates a rotational driving force for rotating the rotational blades and for advancing the tiller unidirectionally while tilling the ground. A power transmission mechanism transmits the rotational driving force of the power source to the rotational blades. A handle for guiding the tiller is pivotally connected to a rear portion of the power source or to a rear portion of the power transmission mechanism so that shock energy generated during tilling of the ground and transmitted to the power source or the power transmission mechanism is absorbed by pivotal movement of the power source or the power transmission mechanism relative to the handle about a pivot point spaced rearwardly from a center of gravity of the tiller and disposed approximately at the same height as the center of gravity of the tiller from a surface of the ground.

20 Claims, 25 Drawing Sheets

FIG.27
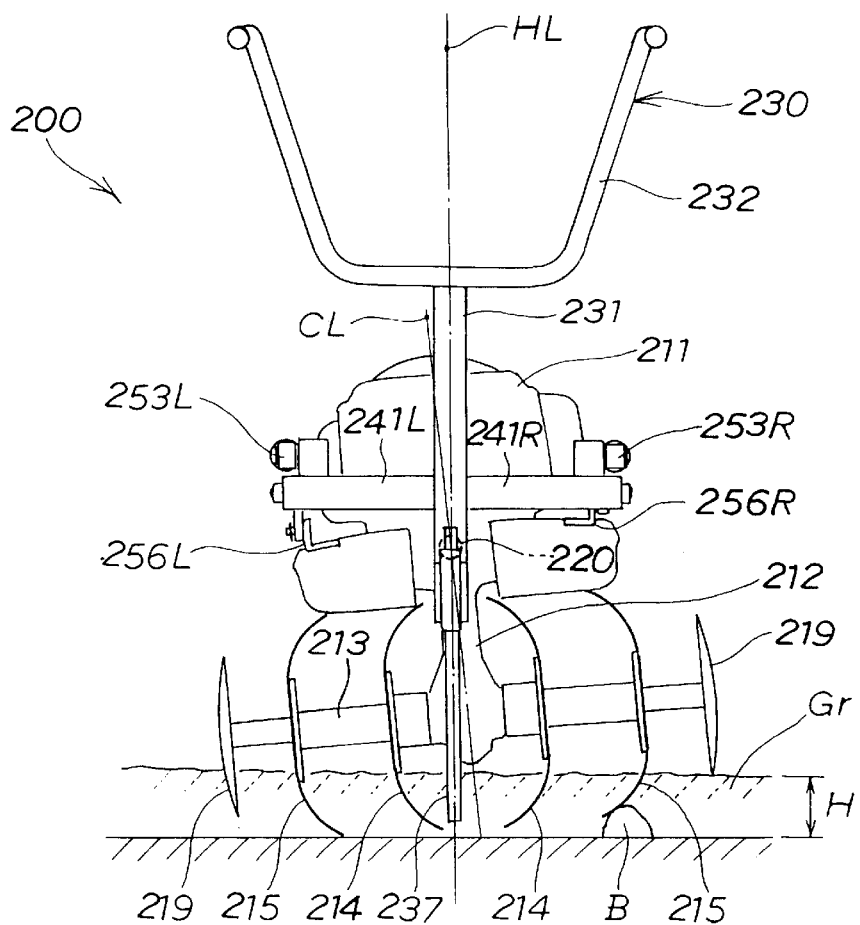
FIG.28
(a) 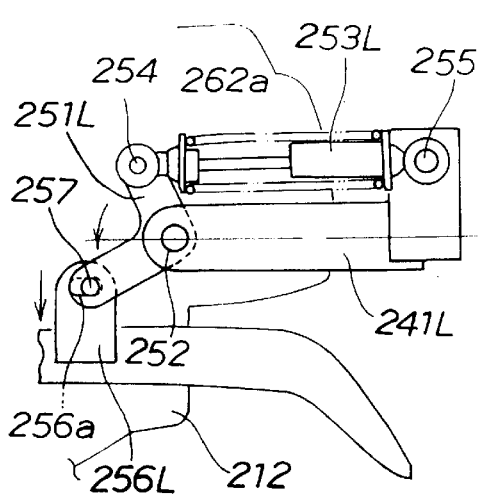
(b) 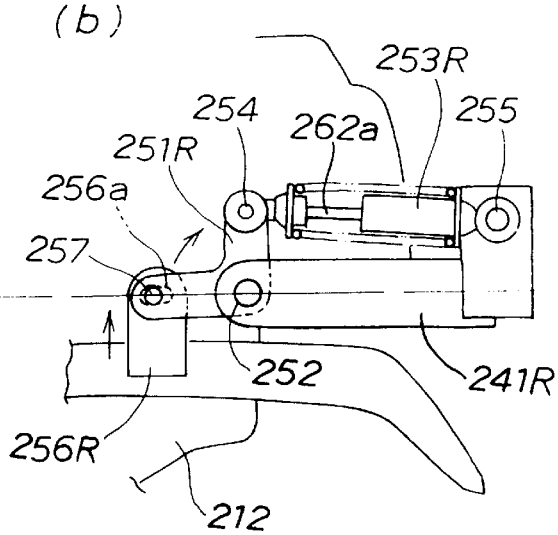

SMALL-SIZED TILLER

BACKGROUND OF THE INVENTION

1. Field of the Invention

The present invention relates to a small-sized tiller and, more particularly, to a small-sized tiller which can easily be steered even when its tilling claw runs onto hard ground or a solid object such as a stone buried in ground during tilling work.

2. Description of the Related Art

In recent years, small-sized tillers designed to be smaller than tillers for exclusive use in farms have been widely used as tillers for kitchen gardens or small fields, because such small-sized tillers are easy to handle and have small turning circles. Japanese Utility Model Laid-Open Publication No. SHO-57-86502, for example, discloses a small-sized tiller which runs while tilling soil by the rotation of a tilling claw fitted to a tilling shaft.

The small-sized tiller has a transmission fitted to the lower portion of an engine, a rotating shaft fitted to the lower portion of the transmission, and plural tilling claws fitted to the rotating shaft in such a manner as to be spaced apart from one another at predetermined intervals. The small-sized tiller runs while effecting tilling by means of the plural claws. This small-sized tiller has a manipulating handle fitted to the rear upper portion of the transmission. A resistance bar is fitted to the transmission, and extends downwardly from the rear of the transmission. The resistance bar is inserted into ground during tilling work.

If the tilling claws strike on a hard solid object such as a stone during tilling work using the small-sized tiller, the tilling claws ride onto the solid object and the tilling shaft bounds upwardly, causing a phenomenon which causes the small-sized tiller to bound owing to a tilling reaction force. Shock energy at this time conducts from the tilling claws to the transmission, the engine and the manipulating handle via the rotating shaft. In particular, if the right or left tilling claws as viewed from an operator strike on the solid object, the tiller will bound on its right or left side and will lose the balance between the right and left sides.

If the operator is to steer the small-sized tiller subjected to shock energy while keeping the balance between the right and the left sides, or is to restrain the bounding phenomenon, (1) the operator needs to adjust the length by which to insert the resistance bar into ground, by appropriately setting the height at which to fit the resistance bar, according to the conditions of soil, or (2) the operator needs to adjust the load under which to insert the resistance into ground, by applying an adequate downward manipulating force to the manipulating handle during tilling work. In this way, it is possible to adjust the resistance force of the resistance bar against the shock energy.

However, even if the operator can adjust the length by which to insert the resistance bar into ground and the load under which to insert the resistance into ground, the operator will need experience and intuition to steer the small-sized tiller subjected to the shock energy while keeping the balance between the right and left sides thereof, or to restrain the bounding phenomenon.

Furthermore, a large number of cultivated lands such as fields have surfaces with uneven areas among ridges, and differ in the hardness of surface soil. If such ground is tilled with the small-sized tiller, the amount of tilling by the left tilling claws will differ from the amount of tilling by the right tilling claws. In this case, how to maintain the rectilinear running of the small-sized tiller while keeping the balance between the right and left sides of the same has influence on the degree of finish of tilling. For this reason, the operator needs experience and intuition to adjust the length by which to insert the resistance bar into ground and the load under which to insert the resistance into ground, and steer the small-sized tiller while keeping the balance between the right and left sides of the same.

Accordingly, since the operator needs skill if the operator is to steer the related art small-sized tiller for tilling work, there has been a demand for an improvement in the small-sized tiller.

SUMMARY OF THE INVENTION

The present invention has been made in view of the above-described points, and aims to provide a small-sized tiller which is at all times easy to steer and enables far easier tilling work.

According to an aspect of the present invention, there is provided a small-sized tiller characterized by a power source, a power transmission mechanism for transmitting a rotational driving force of the power source to a tilling shaft, plural tilling claws fitted to the tilling shaft and arranged to cause the tiller to run, by rotating while tilling ground, a resistance bar to be inserted in ground, and a manipulating handle which is swingably fitted via a pivot to a rear portion of the power source or a rear portion of the power transmission mechanism.

The manipulating handle is upwardly and downwardly swingably fitted to the rear portion of the power source or the rear portion of the power transmission mechanism.

A damping member for effecting damping when the power source and the power transmission mechanism swing upwardly or downwardly with respect to the manipulating handle is interposed between the power source or the power transmission mechanism and the manipulating handle.

A first link is upwardly and downwardly swingably fitted to the rear portion of the power source or the rear portion of the power transmission mechanism, while a second link is forwardly and rearwardly swingably fitted to the manipulating handle, the first link being connected to the second link to constitute a link mechanism which can be bent according to a forward or rearward swing of the power source and the power transmission mechanism. One end of a damping member is forwardly and rearwardly swingably connected to a connection portion between the first and second links, while the other end of the damping member is forwardly and rearwardly swingably connected to the manipulating handle, to enable the proportion of the stroke of the damping member per predetermined amount of swing to vary to a larger extent as the power source and the power transmission mechanism swing in a direction in which the power source and the power transmission mechanism approach the manipulating handle.

The resistance bar may be fitted to extend downwardly from the manipulating handle or to extend downwardly from the rear portion of the power transmission mechanism.

During tilling work with the tiller according to the present invention, if the tilling claws strike on a solid object such as a stone buried in ground, a bounding phenomenon occurs due to a tilling reaction force. Shock energy which is the tilling reaction force at this time conducts from the tilling claws to the power source and the power transmission mechanism. Since the resistance bar is inserted in ground, the resistance bar has a resistance force against the bounding phenomenon, whereby the resistance bar and the manipulating handle are in a stable state. Since the tilling claws, the power source and the power transmission mechanism swing, particularly upwardly, with respect to the manipulating handle which is in such a stable state, the shock energy can be absorbed. The manipulating handle is stable without bounding, and the steering of the tiller becomes easy.

It is preferable that the damping member for effecting damping when the power source and the power transmission mechanism swing upwardly or downwardly with respect to the manipulating handle be interposed between the power source or the power transmission mechanism and the manipulating handle, because when the power source and the power transmission mechanism swing upwardly or downwardly with respect to the manipulating handle, shock energy can be fully absorbed by the damping member.

A suspension made of the link mechanism and the damping member is a progressive suspension in which the proportion of the stroke of the damping member per predetermined amount of swing varies to a larger extent as the power source and the power transmission mechanism swing in the direction in which they approach the manipulating handle. The damping member absorbs a smaller shock energy with a smaller stroke and a larger shock energy with a larger stroke. Accordingly, the damping member can effectively absorb shock energy.

Since the resistance bar extends downwardly from the manipulating handle, during tilling work, the length by which to insert the resistance bar into ground can be adjusted to stabilize a tilling depth, by applying an adequate downward manipulating force to the manipulating handle. Moreover, it is preferable that the resistance bar be extended downwardly from the rear of the power transmission mechanism as described above, because when a bounding phenomenon occurs, the resistance bar is inserted into ground to restrain the swing of the power source and the power transmission mechanism.

Moreover, in the present invention, the manipulating handle is fitted via a pivot to the rear of the power source or the rear of the power transmission mechanism so that the portion forward of the pivot can swing rightwardly and leftwardly with respect to the manipulating handle as viewed from the operator, thereby absorbing shock energy. In particular, even if the amounts of tilling by the right and left tilling claws differ from each other and the right and left tilling reaction forces differ from each other, the tilling claws, the power source and the power transmission mechanism rotate about the pivot and incline rightwardly or leftwardly with respect to the manipulating handle, thereby absorbing the right and left different tilling reaction forces. Accordingly, the manipulating handle is stable without bounding or inclining, and the operator can steer the small-sized tiller while keeping the balance between the right and left sides of the small-sized tiller.

A pair of right and left damping members for reducing shock occurring due to the rightward and leftward swing of the portion forward of the pivot are interposed between the power source or the power transmission mechanism and the manipulating handle, whereby shock energy is absorbed by the damping members.

A pair of right and left arms are respectively extended from the manipulating handle toward the right and left sides of the power source or the right and left sides of the power transmission mechanism, and the right and left sides of the power source or the right and left sides of the power transmission mechanism are respectively connected to the ends of the pair of right and left arms by a pair of right and left links, the pair of right and left damping members being interposed between the pair of right and left links and the manipulating handle to convert a rightward and leftward swinging motion of the power source and the power transmission mechanism into a forward and rearward swinging motion through the pair of right and left links and transmit the forward and rearward swinging motion to the pair of right and left damping members. Accordingly, in the above-described construction, it is possible to freely set the strokes and arrangement of the damping members, as compared with a case in which the right and left swinging motion of the power source and the power transmission mechanism is directly transmitted to the right and left damping members. In particular, the damping members can be disposed so that they can be expanded and compressed toward the front and the rear of the vehicle body of the small-sized tiller, whereby the small-sized tiller can be made far more compact.

It is preferable that the resistance bar be extended downwardly from the manipulating handle, because the length by which to insert the resistance bar into ground can be adjusted to stabilize the tilling depth during tilling work, by applying an adequate downward manipulating force to the manipulating handle.

BRIEF DESCRIPTION OF THE DRAWINGS

Certain preferred embodiments of the present invention will be described below in detail, by way of example only, with reference to the accompanying drawings, in which:

FIG. 27 is a rear view showing an example in which as viewed from the rear of the small-sized tiller of the third embodiment, an engine and the power transmission mechanism are inclined toward the left owing to the fact that the right tilling claws has struck on a stone buried in ground; and FIG. 28 is a view of the operations of the link bracket, the L-shaped link and the damping member when the small-sized tiller shown in FIG. 27 is inclined.

DETAILED DESCRIPTION OF THE PREFERRED EMBODIMENTS

The following description is merely exemplary in nature and is in no way intended to limit the invention, its application or uses.

Figure 1:
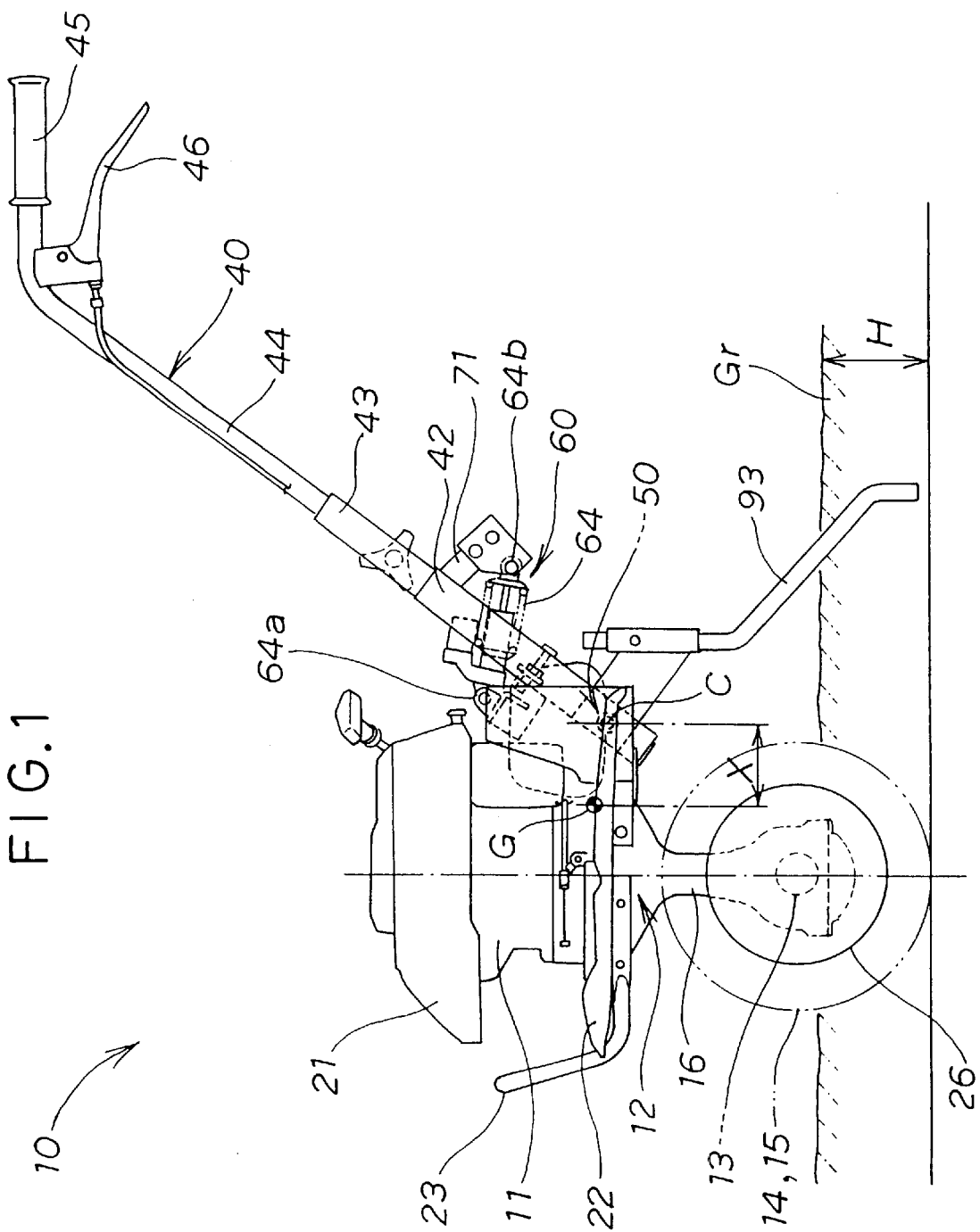
FIG. 1 is a side view showing the whole of a small-sized tiller according to a first embodiment of the present invention.
Figure 2:
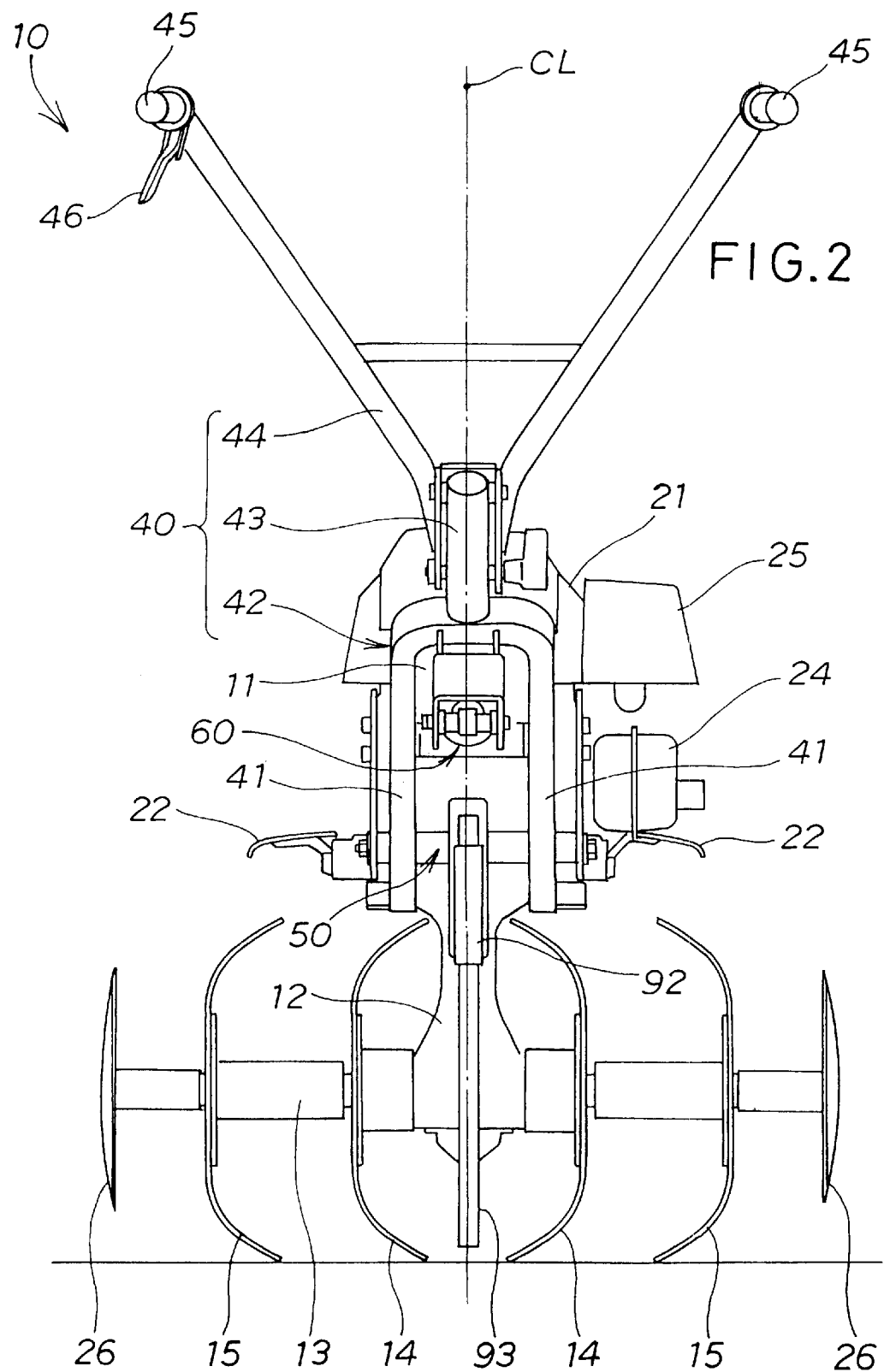
FIG. 2 is a rear view of the small-sized tiller shown in FIG. 1.

Referring to FIGS. 1 and 2, a small-sized tiller 10 according to a first embodiment of the present invention is provided with an engine 11 as a power source. The driving force outputted from the engine 11 rotates a tilling shaft 13 via a power transmission mechanism 12. Plural tilling blades or claws 14 and 15 are fitted to the tilling shaft 13 in the state of being spaced apart from one another at predetermined intervals. The small-sized tiller 10 runs while tilling the ground by means of the rotation of the tilling claws 14 and 15.

The small-sized tiller 10 has a manipulating handle 40 which extends upwardly rearwardly from the rear of the power transmission mechanism 12. A resistance bar 93 is fitted to the manipulating handle 40 in such a manner as to extend downwardly from the lower portion of the manipulating handle 40. In the first embodiment, the manipulating handle 40 is fitted for upward and downward swinging movement about a pivot portion 50 which is provided at the rear of the power transmission mechanism 12.

The power transmission mechanism 12 is a mechanism which transmits the driving force of the engine 11 to the tilling shaft 13, and has plural gears (not shown) which are built in a case 16. The resistance bar 93 is inserted into ground to set a tilling depth H for the first and second tilling claws 14 and 15, and produces resistance forces against the advancing forces of the tilling claws 14 and 15. In FIGS. 1 and 2, reference numeral 21 denotes an engine cover, reference numeral 22 a cover for blocking the splashing of mud or the like, and reference numeral 23 a vehicle-body guard.

As shown in FIG. 2, the engine 11 is disposed along the center line CL of the vehicle body. The power transmission mechanism 12 is fitted to the lower portion of the engine 11. The tilling shaft 13 is fitted to the lower portion of the power transmission mechanism 12 in such a manner as to extend in the width direction of the tiller 10. The plural tilling claws 14 and 15 include the first tilling claws 14 and 14 which are respectively disposed at inward positions adjacent to the vehicle-body center line CL, and the second tilling claws 15 and 15 which are respectively disposed at positions outward of the first tilling claws 14 and 14. The plural tilling claws 14 and 15 are fitted to the tilling shaft 13 in such a manner as to be arranged at a predetermined pitch in the longitudinal direction of the tilling shaft 13.

The manipulating handle 40 is made of a handle post part 42 of inverse U-like shape which has right and left leg portions 41 and 41 at the rear of the power transmission mechanism 12, a vertical handle fitting part 43 which is fixed to the top end of the handle post part 42 along the vehicle-body center line CL, and a handle part 44 of V-like shape which is fitted to the handle fitting part 43.

In FIG. 2, reference numeral 24 denotes a fuel tank, reference numeral 25 an air cleaner, reference numerals 26 and 26 side disks, reference numerals 45 and 45 grips, and reference numeral 46 a clutch lever.

Figure 3:
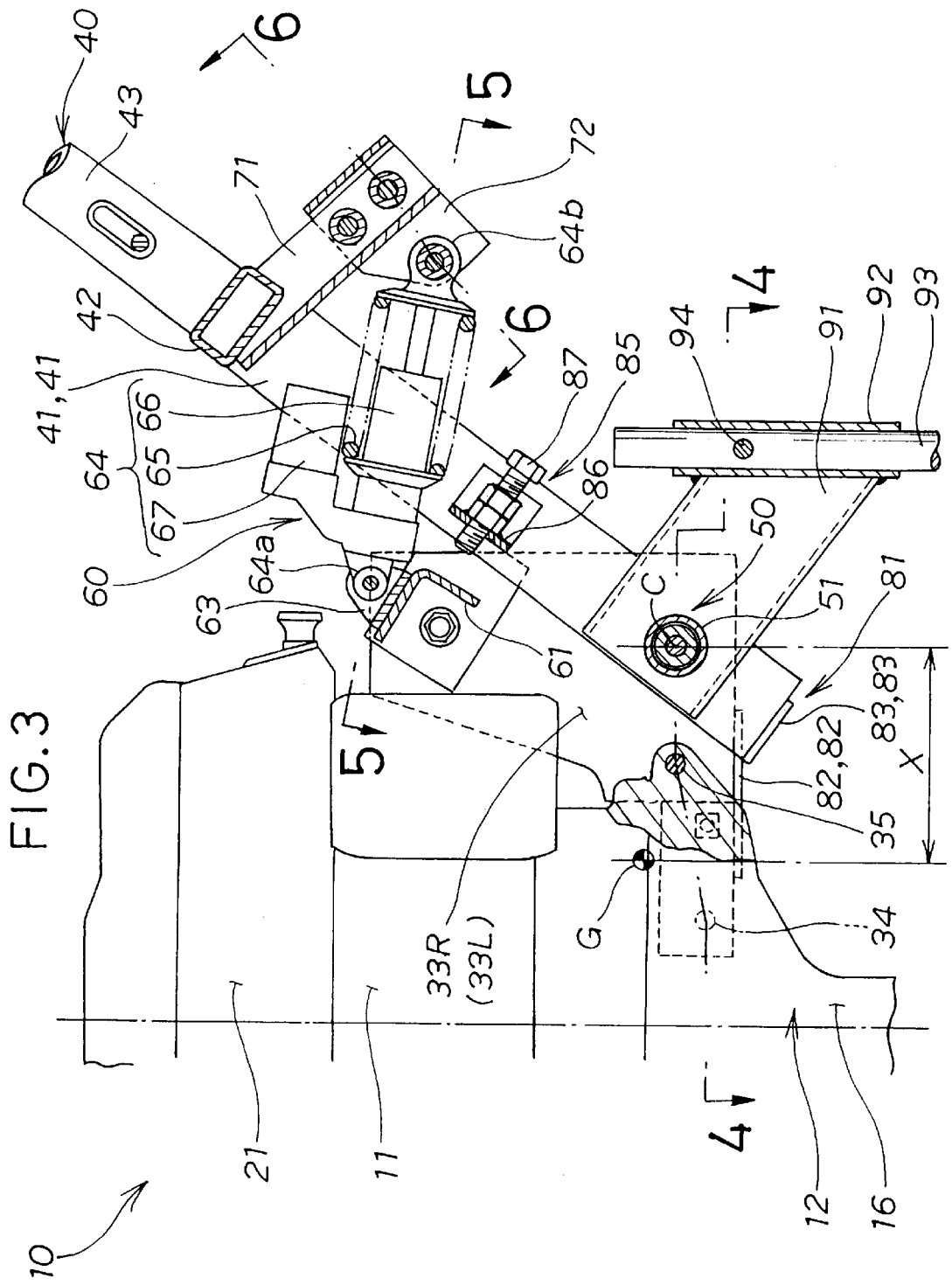
FIG. 3 is a partly cross-sectional, enlarged side view showing of the suspension system shown in FIG. 1.

FIG. 3 is a cross-sectional side view of the manipulating-handle fitting structure of the small-sized tiller 10, and shows a specific fitting structure of the manipulating handle 40 and that of the resistance bar 93.

The fitting structure of the manipulating handle 40 is such that right and left brackets 33R and 33L (only the right one of which is shown in FIG. 3) are fitted to the rear lower portion of the power transmission mechanism 12, and the lower portion of the handle post part 42 is pivotally connected directly to the rear lower portions of the brackets 33R and 33L so that the handle post part 42 can swing up and down about the pivot portion 50. In other words, the engine 11 and the power transmission mechanism 12 are fitted for upward and downward swinging movement with respect to the manipulating handle 40.

The tiller 10 according to the first embodiment is provided with a suspension 60 which suspends the engine 11 and the power transmission mechanism 12 on the manipulating handle 40. The suspension 60 has a structure in which a damping member 64 is interposed between the power transmission mechanism 12 and the manipulating handle 40.

The damping member 64 is a damper which effects damping when the engine 11 and the power transmission mechanism 12 are swinging up and down with respect to the manipulating handle 40 as described above; for example, an oil damper 66 having a coil spring 65 which can be compressed and expanded toward the front and the rear of the tiller 10. Reference numeral 67 denotes a reservoir tank.

The suspension 60 includes a cross member 61 made of a steel material of L-like cross-sectional shape, and the cross member 61 is passed between the rear upper portions of the respective right and left brackets 33R and 33L. In addition, the suspension 60 includes an arm 71 which extends rearwardly downwardly from the upper portion of the handle post part 42. The arm 71 is upwardly and downwardly swingably fitted to the rear end (the other end) 64b of the damping member 64. The front end (one end) 64a of the damping member 64 is upwardly and downwardly swingably fitted to the cross member 61.

The handle post part 42 is provided with a lower-limit stopper portion 81 and an upper-limit stopper portion 85 in order to determine the swinging range of the handle post part 42 (the swinging range of the engine 11 and the power transmission mechanism 12).

The lower-limit stopper portion 81 is provided with lower stopper pieces 82 and 82 fitted to the lower ends of the respective brackets 33R and 33L, and abutment pieces 83 and 83 fitted to the lower ends of the respective leg portions 41 and 41 of the handle post part 42. The lower-limit swing position of the handle post part 42 is determined by the abutment pieces 83 and 83 being respectively brought into abutment with the lower surfaces of the lower stopper pieces 82 and 82.

The upper-limit stopper portion 85 has a structure in which a horizontal member 86 is passed between the leg portions 41 and 41 of the handle post part 42 and a positioning bolt 87 is fitted into the horizontal member 86 so that it can be adjusted to move back and forth. The upper-limit swing position of the handle post part 42 is determined by the position at which the point of the positioning bolt 87 is brought into abutment with the cross member 61.

Figure 4:
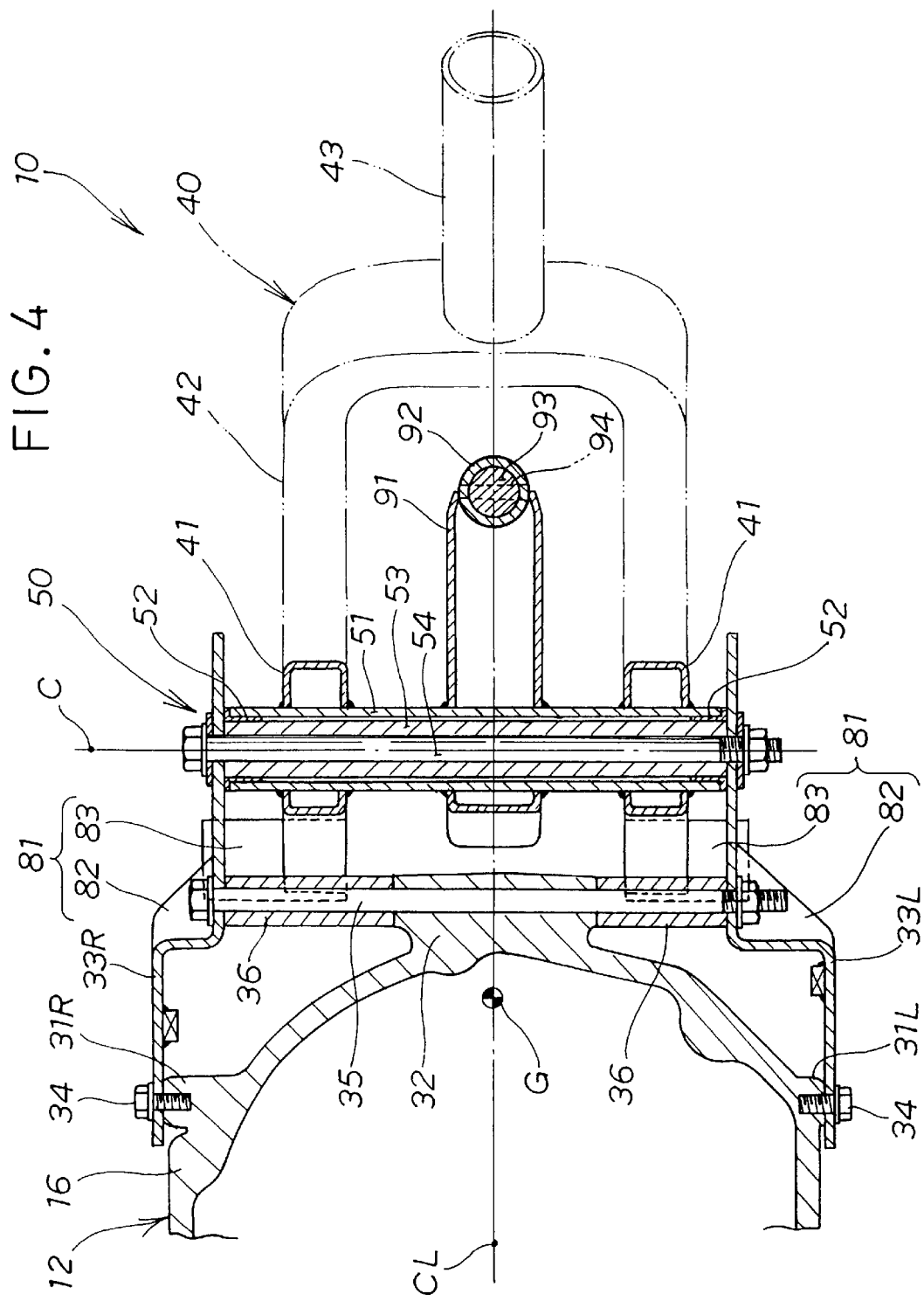
FIG. 4 is an enlarged cross-sectional view taken along line 4—4 of FIG. 3.

Referring to FIG. 4 which shows in detail the fitting structure of the manipulating handle 40, the case 16 of the power transmission mechanism 12 has side fitting bosses 31R and 31L on both right and left sides and a rear fitting boss 32 at its rear end portion.

Each of the right and left brackets 33R and 33L is a member formed by bending a plate into a crank-like shape in cross section. This one pair of right and left brackets 33R and 33L are respectively fitted to the side fitting bosses 31R and 31L by bolts 34 and 34, and are fastened to the rear fitting boss 32 by one long bolt 35. Reference numerals 36 and 36 denote spacers.

The structure of the pivot portion 50 supports the handle post part 42 for upward and downward swinging movement on the right and left brackets 33R and 33L.

The pivot portion 50 is provided with a cross pipe 51 which is inserted through the right and left leg portions 41 and 41 of the handle post part 42 and is passed between the right and left brackets 33R and 33L. A pipe-like shaft 53 is rotatably inserted in the cross pipe 51 through bushes 52 and 52. One long supporting bolt 54 is inserted through the hole of the shaft 53 to fasten together the right and left brackets 33R and 33L and the shaft 53, thereby supporting the handle post part 42 on the right and left brackets 33R and 33L for upward and downward swinging movement about the supporting bolt 54.

Since the handle post part 42 is formed in the inverse U-like shape and the right and left leg portions 41 and 41 are fitted to the case 16 of the power transmission mechanism 12, the manipulating handle 40 can be supported at two right and left locations within a large support span. Accordingly, even if an external force acts on the manipulating handle 40 from either side, the manipulating handle 40 does not sway and is kept stable, whereby stable steering can be realized.

An arm 91 is fitted to the cross pipe 51 along the vehicle-body center line CL (at the position of the center of gravity G of the entire tiller). The arm 91 is extended rearwardly, and a holding pipe 92 which extends vertically (in the direction perpendicular to the surface of the sheet of FIG. 4) is fitted to the rear end of the arm 91. The resistance bar 93 is upwardly and downwardly slidably fitted into the holding pipe 92 and is secured by a securing bolt 94.

Figure 5:
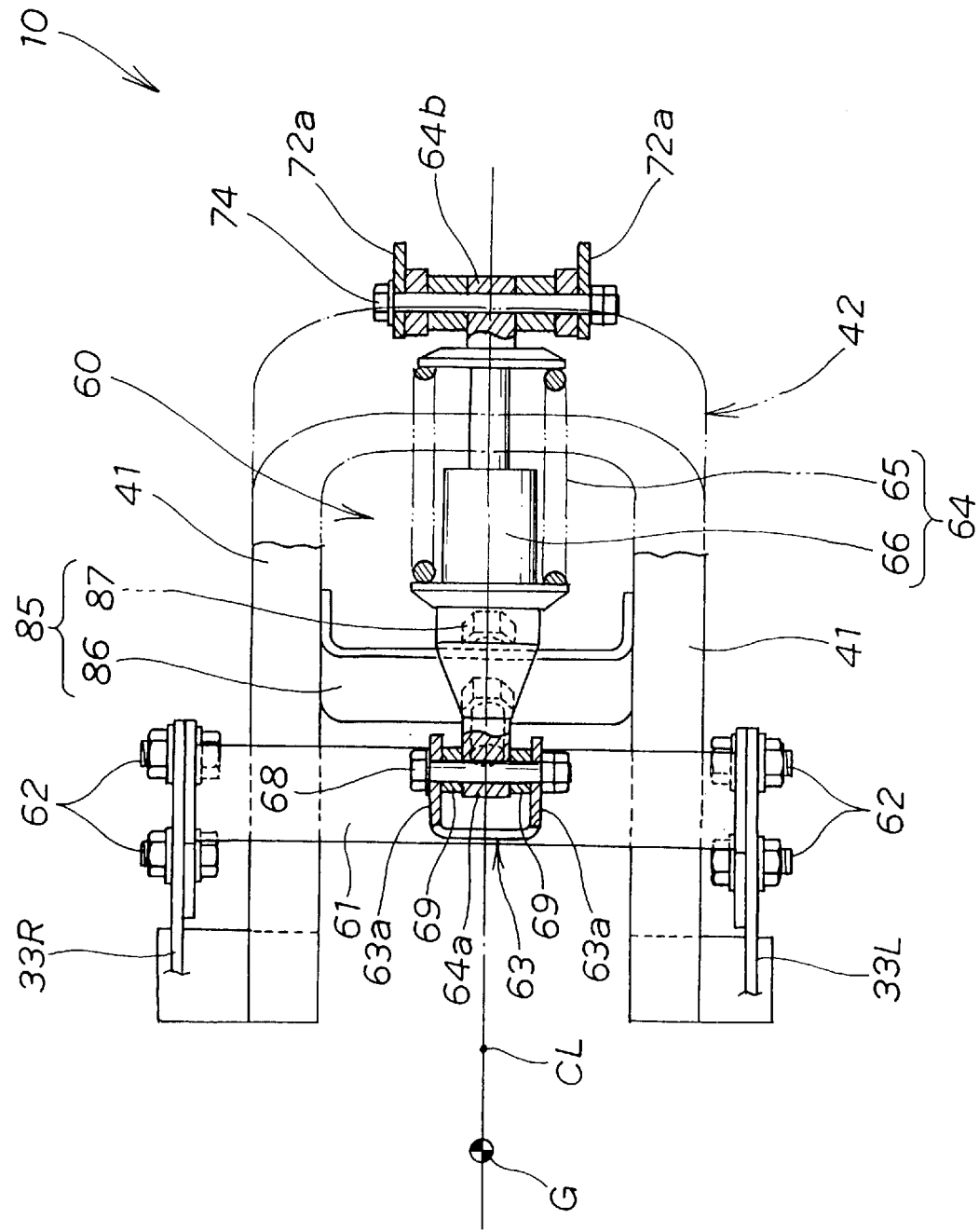
FIG. 5 is an enlarged cross-sectional view taken along line 5–5 of FIG. 3.

The suspension 60 will be described below with reference to FIG. 5. Both ends of the cross member 61 are respectively fitted to the right and left brackets 33R and 33L by plural bolts 62. A holder 63 having a channel-like shape in cross section is fitted to the upper surface of the cross member 61. A front end 64a of the damping member 64 is rotatably fitted to both flanges 63a and 63a of the holder 63 by a connecting bolt 68. The damping member 64 is disposed along the vehicle-body center line CL between the right and left leg portions 41 and 41 of the handle post part 42 of inverse U-like shape. The fitting position of the front end 64a of the damping member 64 is close to the center of gravity G of the entire tiller. Reference numerals 69 and 69 denote spacers. The positioning bolt 87 is disposed along the vehicle-body center line CL.

Figure 6:
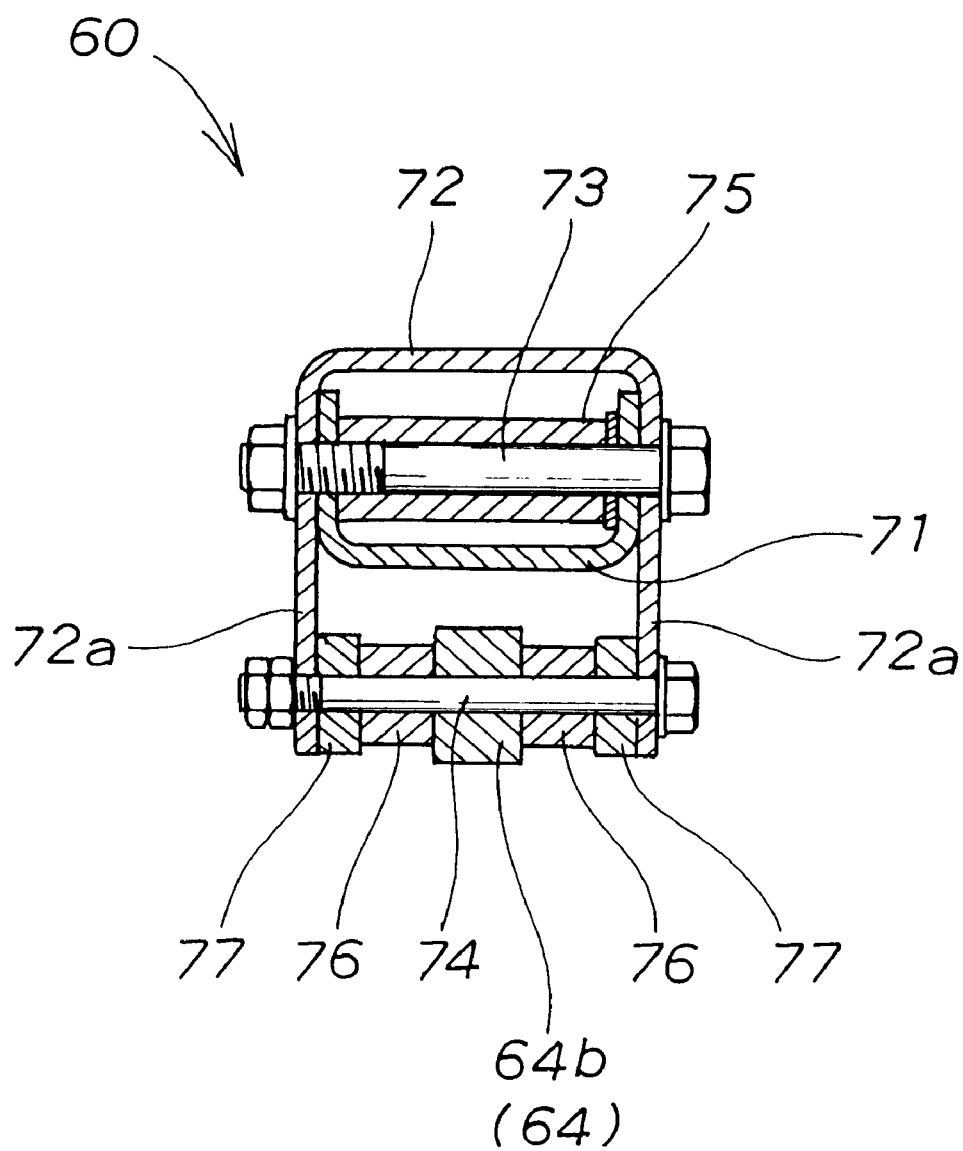
FIG. 6 is an enlarged cross-sectional view taken along line 6—6 of FIG. 3.

FIG. 6 shows the state of connection between the damping member 64 and the arm 71. A channel-shaped holder 72 having an open bottom is fitted to the rear end of the arm 71 made of a channel steel having an open top by a bolt 73 in such a manner that the channel-shaped holder 72 covers the rear end of the arm 71. A rear end 64b of the damping member 64 is rotationally swingably fitted to flanges 72a and 72a of the channel-shaped holder 72 by a connecting bolt 74. Reference numerals 75, 76 and 76 denote spacers, and reference numerals 77 and 77 denote collars.

The operation of the small-sized tiller 10 will be described below with reference to FIGS. 1, 4, 5, 7 and 8.

Referring to FIG. 1, after the engine 11 has been started, an operator (not shown) grips the manipulating handle 49 and starts walking while steering the small-sized tiller. The tiller 10 advances and tills ground while rotating the first and second tilling claws 14 and 15 by means of the power transmission mechanism 12 and the tilling shaft 13 by the driving force of the engine 11.

During tilling work, since the resistance bar 93 is inserted into ground Gr., the tilling depth H for the first and second tilling claws 14 and 15 is set, and resistance forces against the driving forces of the first and second tilling claws 14 and 15 can also be applied to the small-sized tiller 10.

As shown in FIG. 1, the swing center C of the manipulating handle 40, i.e., the center of the pivot portion 50, lies in the vicinity of the center of gravity G of the entire tiller. Specifically, the swing center C is set at a position rearwardly away from the center of gravity G by a distance X, and at nearly the same height as the center of gravity G. The distance X is set as follows. The distance X is set so that during tilling work, when the resistance bar 93 is inserted into the ground Gr. to produce resistance forces against the tractate forces of the first and second tilling claws 14 and 15, the position of the center of gravity G of the entire tiller travels rearwardly and nearly coincides with the swing center C.

By making the position of the center of gravity G of the entire tiller coincident with or close to the swing center C, it is possible to reduce mass when the engine 11 and the power transmission mechanism 12 swings with respect to the manipulating handle 40. Accordingly, it is possible to reduce moment of inertia.

Moreover, the fitting position of the front end 64a of the damping member 64 is set to a position nearly directly above the swing center C in the vicinity of the center of gravity G of the entire tiller. It is, therefore, possible to stabilize the running of the small-sized tiller 10, whereby it is possible to improve the straight-running performance and the turning performance of the small-sized tiller 10. Accordingly, it is possible to improve the steering performance of the small-sized tiller 10 to facilitate tilling operation.

In this manner, in order that the swing center C and the fitting position of the front end 64a of the damping member 64 be made close to the center of gravity G of the entire tiller, the handle post part 42 is, as shown in FIG. 4, formed into the inverse U-like shape and the power transmission mechanism 12 is fitted in the state of being clamped between the right and left leg portions 41 and 41 by means of the right and left brackets 33R and 33L.

In the following description, the load of the manipulating handle 40 that can be supported by the damping member 64 is called "spring borne load", and a load which acts on the damping member 64, i.e., the load of the engine 11, the power transmission mechanism 12, the tilling shaft 13, the first and second tilling claws 14 and 15 and the like, is called "unsparing load". In general, if the value obtained by dividing the unsparing load (numerator) by the spring borne load (denominator) is made small, the vibrations of the first and second tilling claws 14 and 15 are prevented from easily conducting to the manipulating handle 40, whereby superior manipulation sensation can be realized. If this superior manipulation sensation is to be realized, it is preferable to set the spring borne load to a large load.

The operator can insert the resistance bar 93 integral with the manipulating handle 40 into the ground Gr. by applying a downward manipulating force to the manipulating handle 40. Since the resistance bar 93 which extends downwardly from the manipulating handle 40 is inserted in the ground Gr., the resistance bar 93 has a resistance force in a direction perpendicular to the axis of the resistance bar 93. Therefore, the resistance bar 93 and the manipulating handle 40 are stable in the forward, rearward, rightward and leftward directions. Accordingly, the manipulating force required to force the manipulating handle 40 forwardly is nearly constant.

The compound force of the manipulating force of the manipulating handle 40 and the resistance force of the resistance bar 93 inserted in the ground Gr. is the spring borne load. The spring borne load which acts on the rear end 64b of the damping member 64 via the arm 71 from the manipulating handle 40 can be set to a larger load according to the upward and downward swinging manipulation of the manipulating handle 40.

Figure 7:
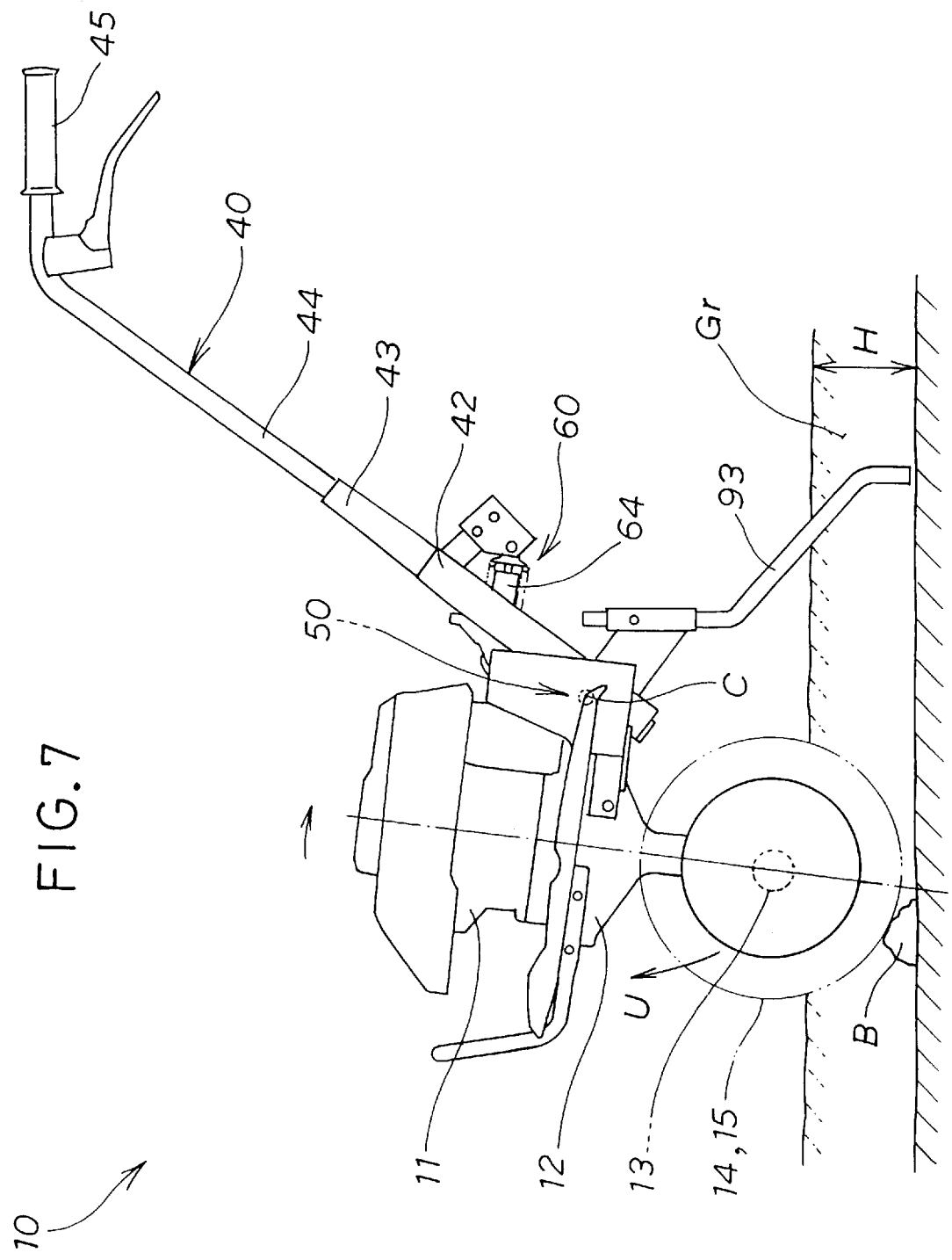
FIG. 7 is a view showing the operation of the entire small-sized tiller when tilling claws strike on a stone buried in ground.

FIG. 7 is a view showing the operation of the small-sized tiller 10.

During tilling work, if the first and second tilling claws 14 and 15 strike on a hard solid object B such as a stone buried in ground, a bounding phenomenon occurs in the direction of an arrow U owing to a tilling reaction force. Shock energy which serves as the tilling reaction force at this time conducts to the engine 11 or the power transmission mechanism 12 from the first and second tilling claws 14 and 15 via the tilling shaft 13.

Since the resistance bar 93 which extends downwardly from the manipulating handle 40 is inserted in the ground Gr., the resistance bar 93 has a resistance force against the bounding phenomenon. Accordingly, the resistance bar 93 and the manipulating handle 40 are unsusceptible to the influence of the bounding phenomenon, and are placed in a stable state.

Figure 8:
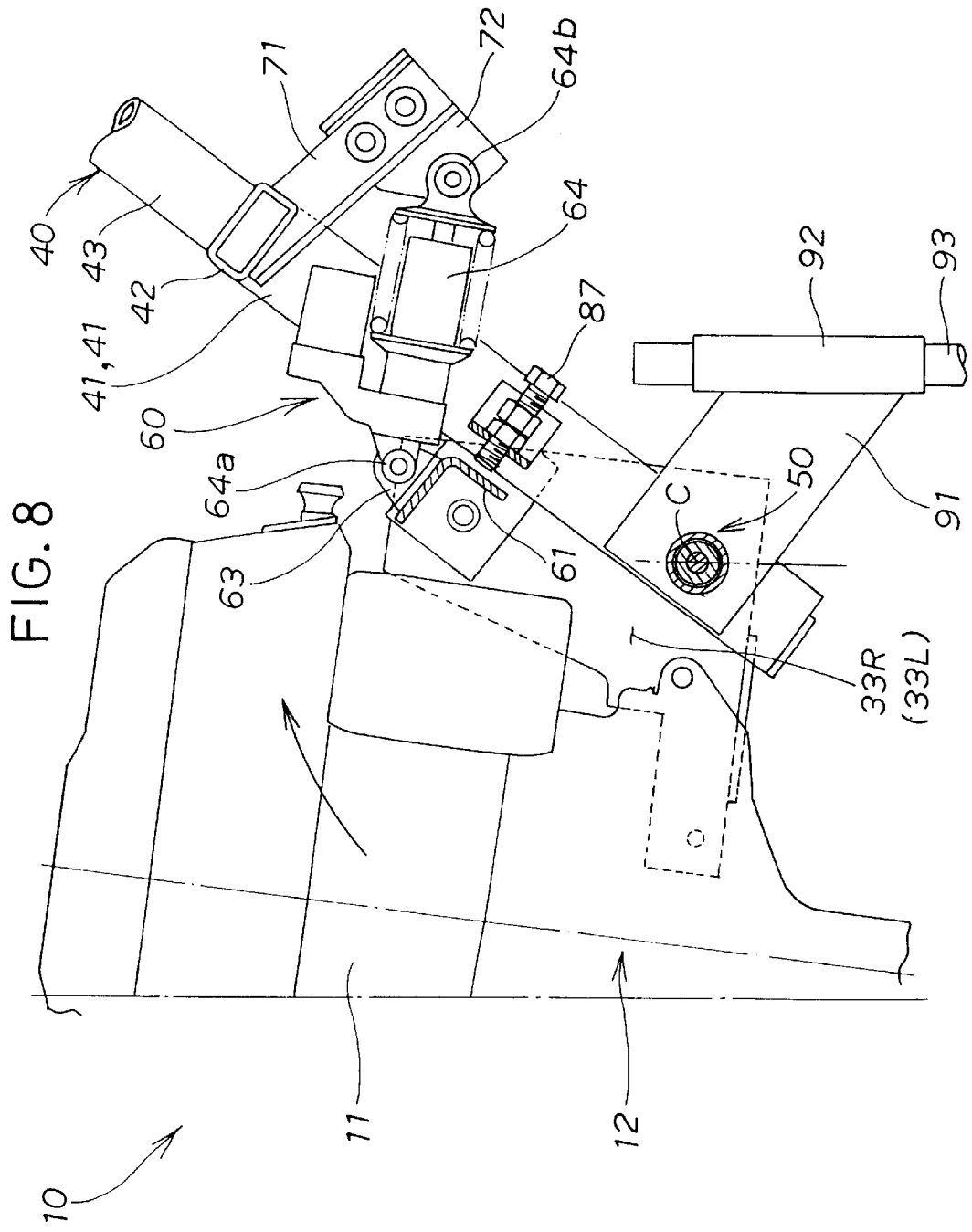
FIG. 8 is view showing the operation of the suspension system when the tilling claws strike on the stone buried in ground.

FIG. 8 is a view similar to FIG. 3, but shows the operations of the manipulating handle 40 and the suspension 60. Although the manipulating handle 40 is in a stable state, the engine 11 and the power transmission mechanism 12 swing upwardly owing to the shock energy as shown in FIG. 7, thereby absorbing the shock energy. Since the manipulating handle 40 is stable without bounding, the manipulatability of the tiller 10 is improved. Accordingly, tilling work becomes easy.

When swinging upwardly, the power transmission mechanism 12 approaches the manipulating handle 40. Accordingly, the shock energy from the power transmission mechanism 12 presses the front end 64a of the damping member 64 via the right and left brackets 33R and 33L, the cross member 61 and the channel-shaped holder 63. The damping member 64 moves rearwardly by a stroke corresponding to the magnitude of the shock energy, thereby fully absorbing the shock energy.

The reaction force of the damping member 64 which has absorbed the shock energy can again be used as a tilling force by the first and second tilling claws 14 and 15 (refer to FIG. 7).

A modification of the fitting position of the resistance bar 93 will be described below. Incidentally, constituent elements identical to the above-described ones are denoted by identical reference numerals, and the description of the identical constituent elements is omitted.

Figure 9:
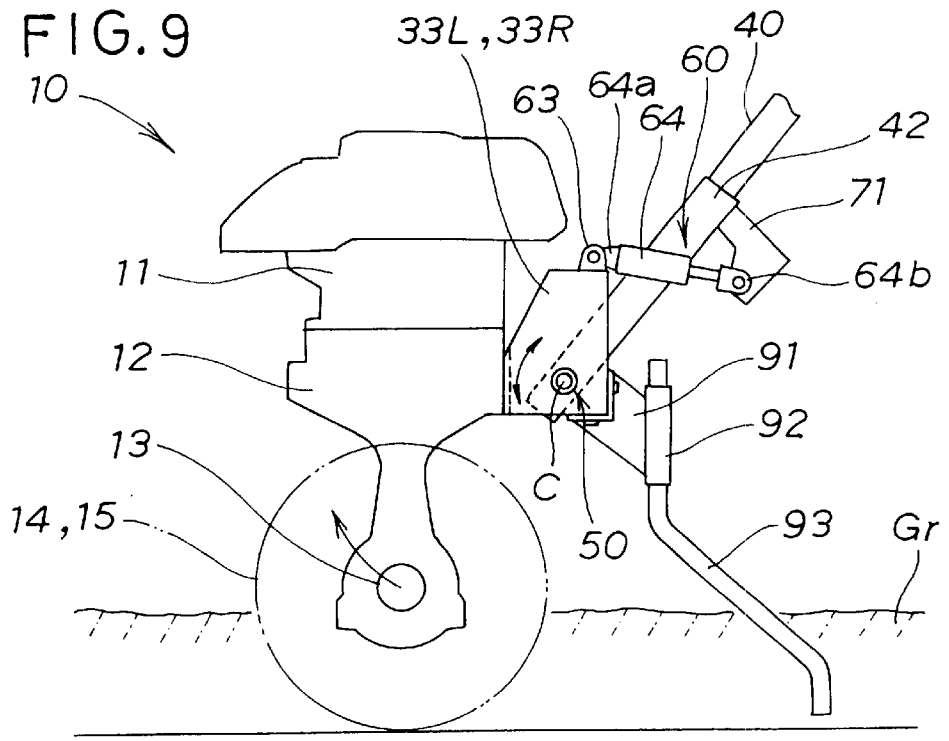
FIG. 9 is a side view showing a first modification of the small-sized tiller shown in FIG. 1.

FIG. 9 is a view of a small-sized tiller, showing the fitting position of the resistance bar 93 according to a first modification.

The resistance bar 93 according to the first modification extends downwardly from the rear of the power transmission mechanism 12. Specifically, the arm 91 is bolted to the rear lower portions of the right and left brackets 33R and 33L, and the resistance bar 93 is fitted to the arm 91 via the holding portion 92.

If a bounding phenomenon occurs, the resistance bar 93 is inserted into ground and restrains the swing of the engine 11 and the power transmission mechanism 12.

Figure 10:
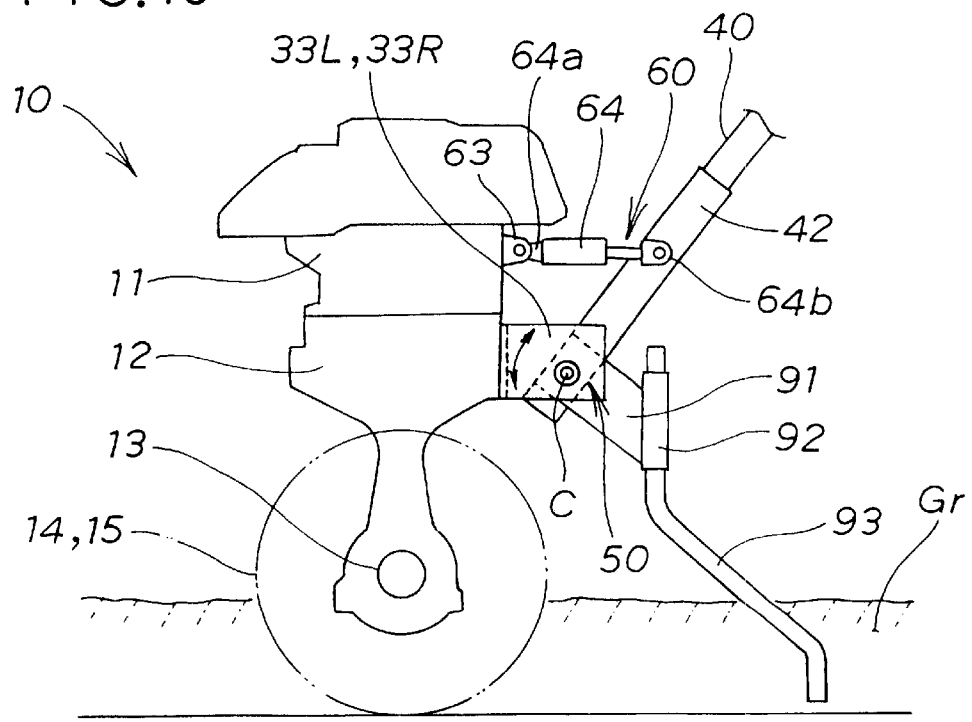
FIG. 10 is a side view showing a second modification of the small-sized tiller shown in FIG. 1.

FIG. 10 shows a second modification relative to the fitting of the resistance bar.

The resistance bar 93 according to the second modification extends downwardly from the manipulating handle 40, and the front end 64a of the damping member 64 is directly fitted to the engine 11 for upward and downward swinging movement with respect to the engine 11.

Figure 11:
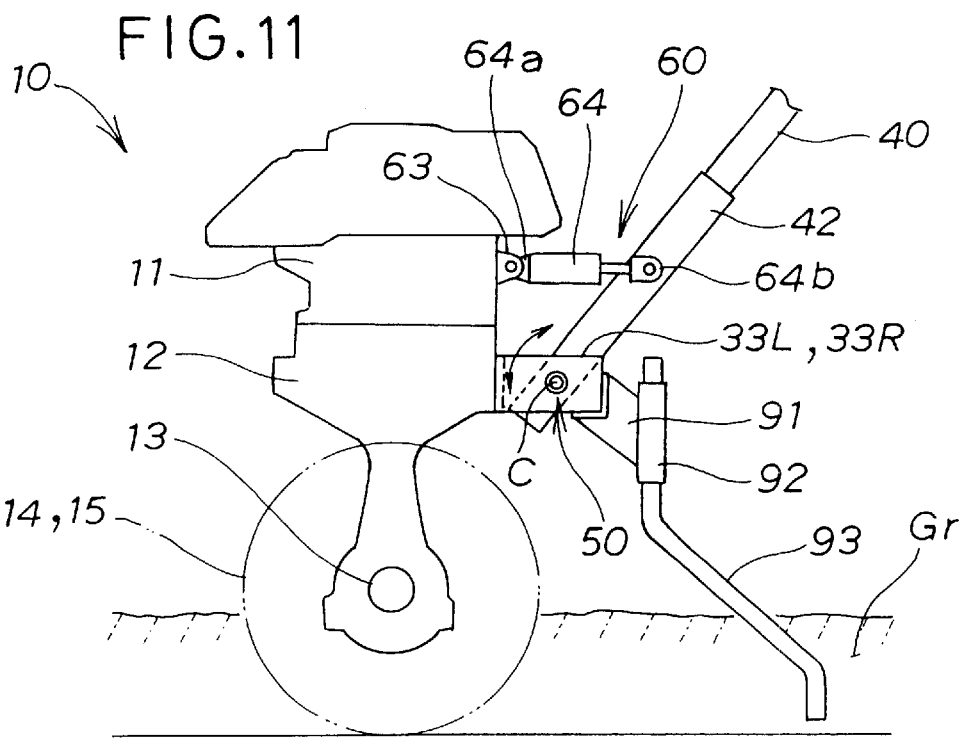
FIG. 11 is a side view showing a third modification of the small-sized tiller shown in FIG. 1.

FIG. 11 shows a third modification relative to the fitting of the resistance bar.

The resistance bar 93 according to the third modification extends downwardly from the rear of the power transmission mechanism 12, and the front end 64a of the damping member 64 is directly fitted to the engine 11 for upward and downward swinging movement with respect to the engine 11.

Figure 12:
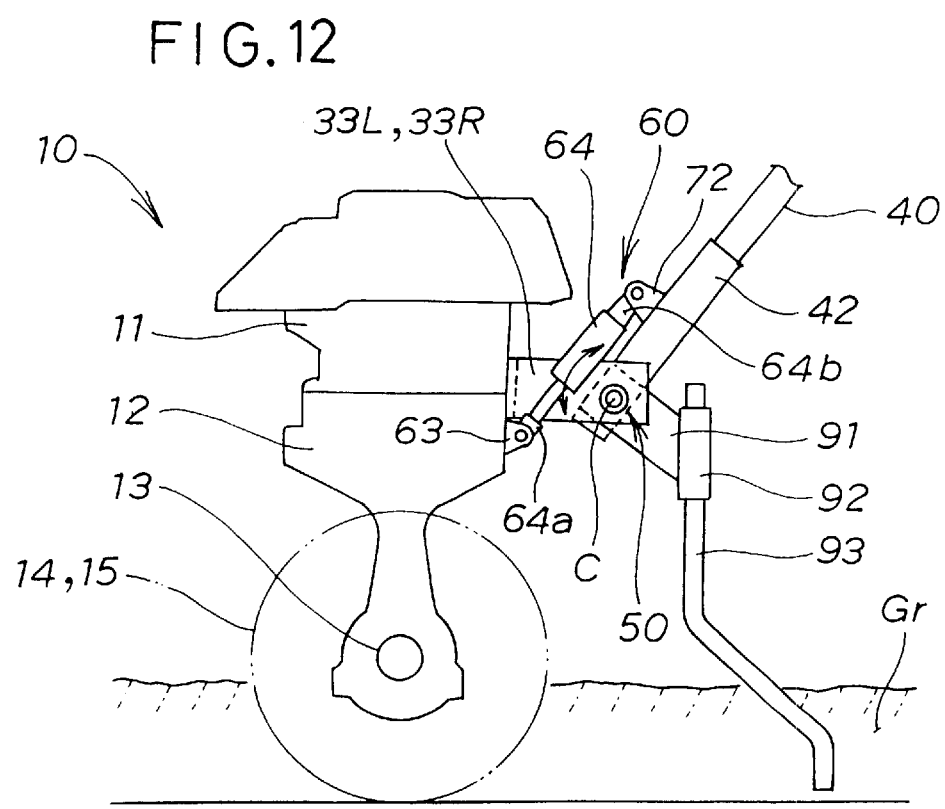
FIG. 12 is a side view showing a fourth modification of the small-sized tiller shown in FIG. 1.

FIG. 12 shows a fourth modification relative to the fitting of the resistance bar.

The resistance bar 93 according to the fourth modification extends downwardly from the manipulating handle 40, and the front end 64a of the damping member 64 is directly fitted to the power transmission mechanism 12 for upward and downward swinging movement with respect to the power transmission mechanism 12.

Figure 13:
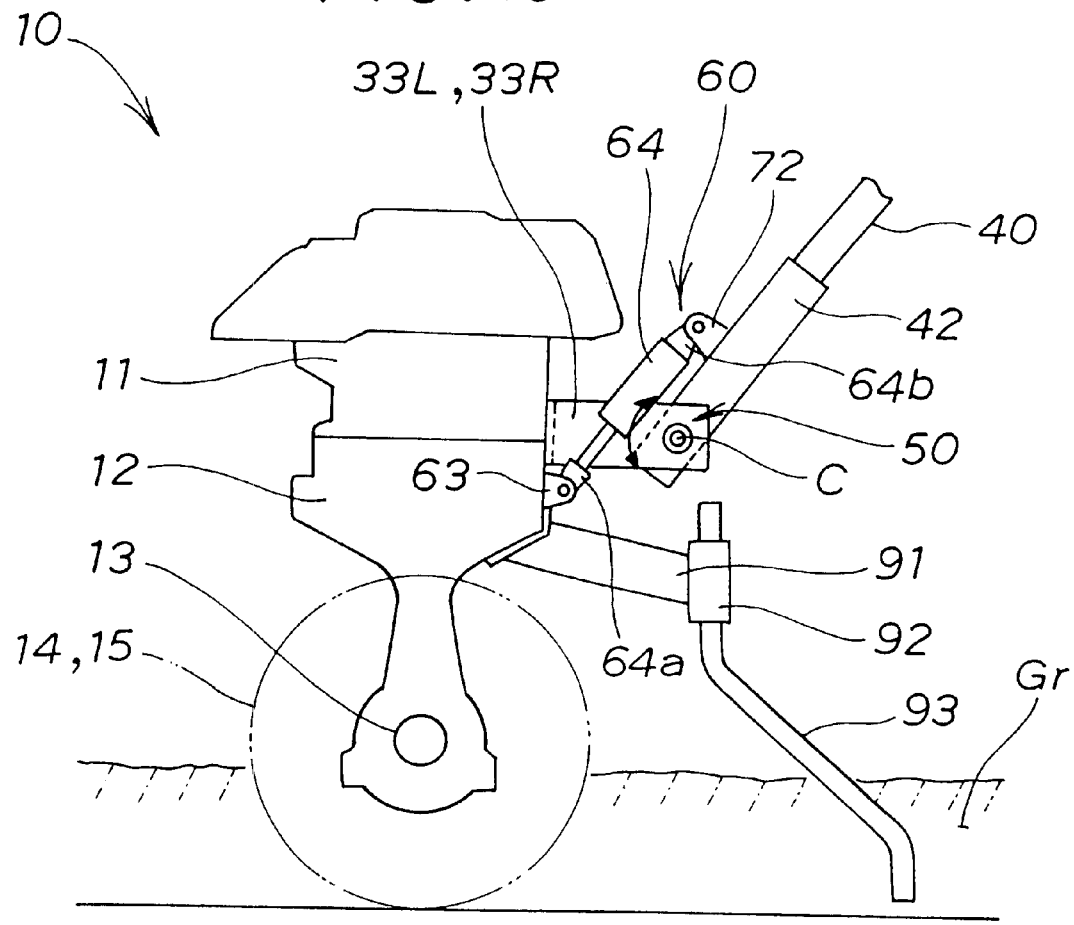
FIG. 13 is a side view showing a fifth modification of the small-sized tiller shown in FIG. 1.

FIG. 13 shows a fifth modification relative to the fitting of the resistance bar.

The resistance bar 93 according to the fifth modification extends downwardly from the rear of the power transmission mechanism 12, and the front end 64a of the damping member 64 is directly fitted to the power transmission mechanism 12 for upward and downward swinging movement with respect to the power transmission mechanism 12.

A suspension according to a second embodiment will be described below with reference to FIGS. 14 to 19.

Figure 14:
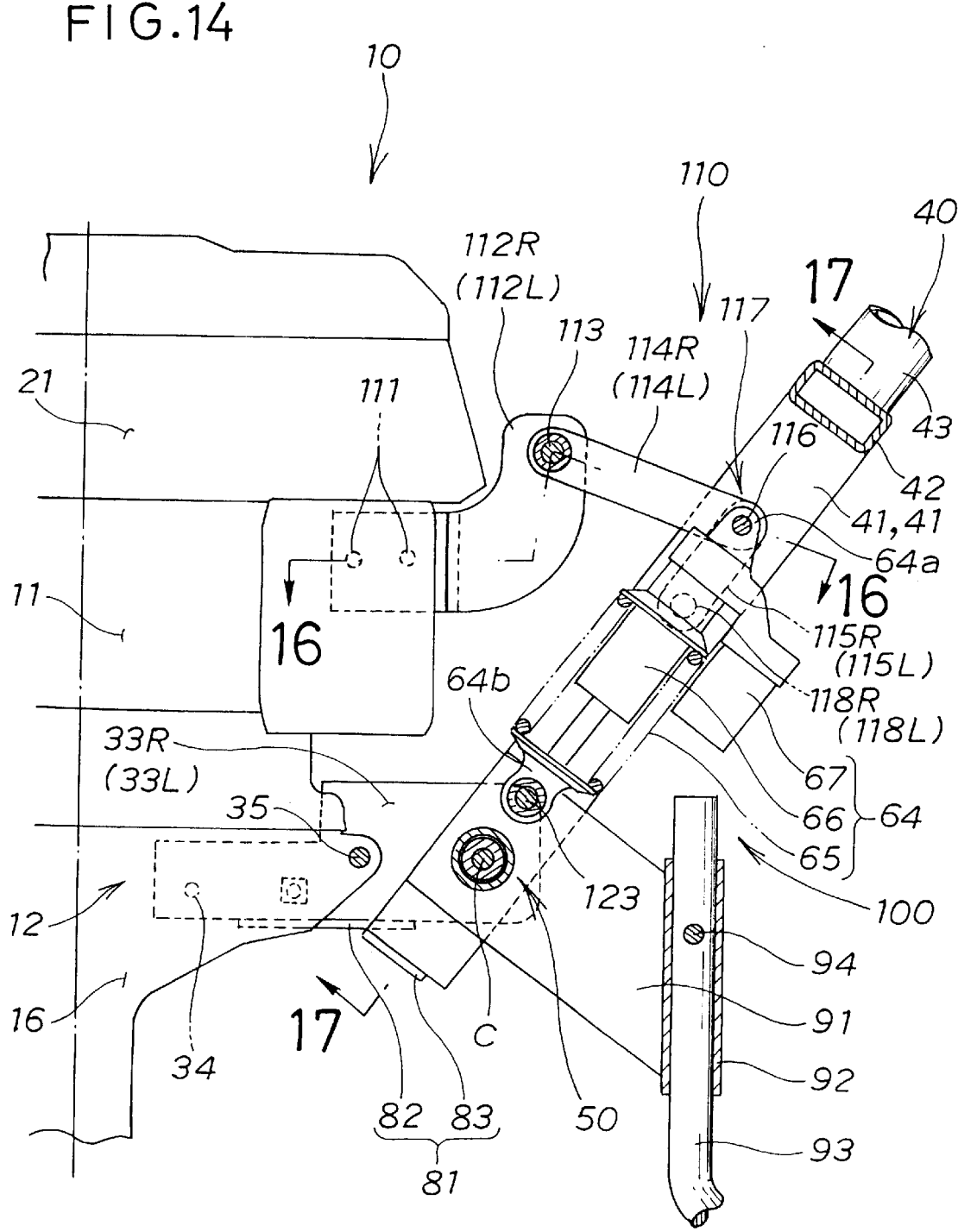
FIG. 14 is a side view showing the fitting structure of a manipulating handle according to a second embodiment.

Referring to FIG. 14, a suspension 100 according to the second embodiment is a progressive suspension in which the proportion of the stroke of the damping member 64 per predetermined amount of swing varies to a larger extent as the engine 11 and the power transmission mechanism 12 swing about the pivot portion 50 in the direction in which they approach the manipulating handle 40.

Figure 15:
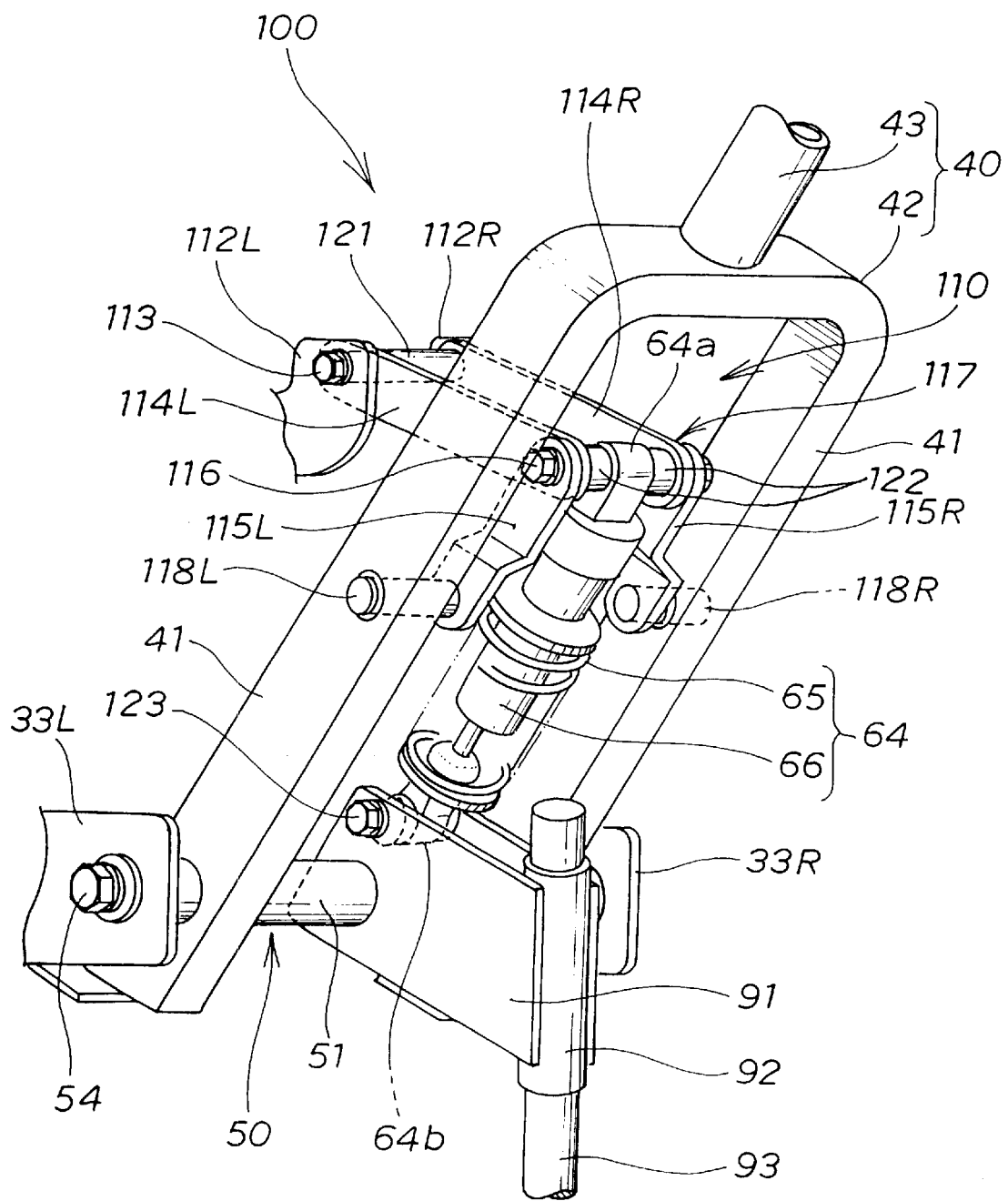
FIG. 15 is a perspective view of the suspension system shown in FIG. 14.
Figure 16:
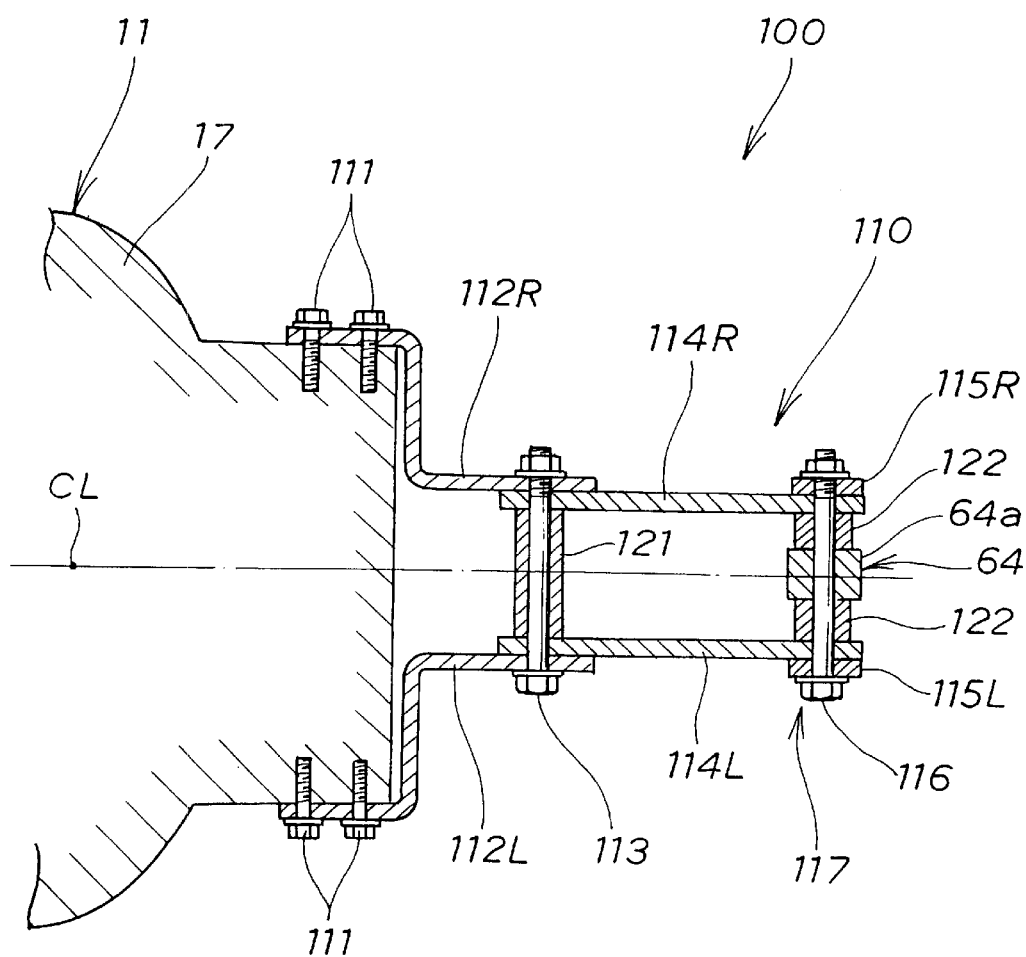
FIG. 16 is an enlarged cross-sectional view taken along line 16—16 of FIG. 14.

The suspension 100 according to the second embodiment has a combined structure of a link mechanism 110 and the damping member 64 as shown in FIGS. 15 and 16. The link mechanism 110 is made of a bendable link mechanism provided with right and left first links 114R and 114L, right and left second links 115R and 115L, and a connecting bolt 116 which rotatably connect these links.

The right and left first links 114R and 114L are rotatably fitted to the rear of the engine 11 via a pair of right and left upper brackets 112R and 112L by a connecting bolt 113. The upper brackets 112R and 112L are fitted to both right and left sides of a case 17 of the engine 11 by plural bolts 111. The front ends of the first links 114R and 114L are rotatably fitted to the rear ends of the upper brackets 112R and 112L by the connecting bolt 113. The first links 114R and 114L extend rearwardly.

The lower ends of the right and left second links 115R and 115L are rotatably fitted to the right and left leg portions 41 and 41 of the handle post part 42 by connecting pins 118R and 118L.

Figure 17:
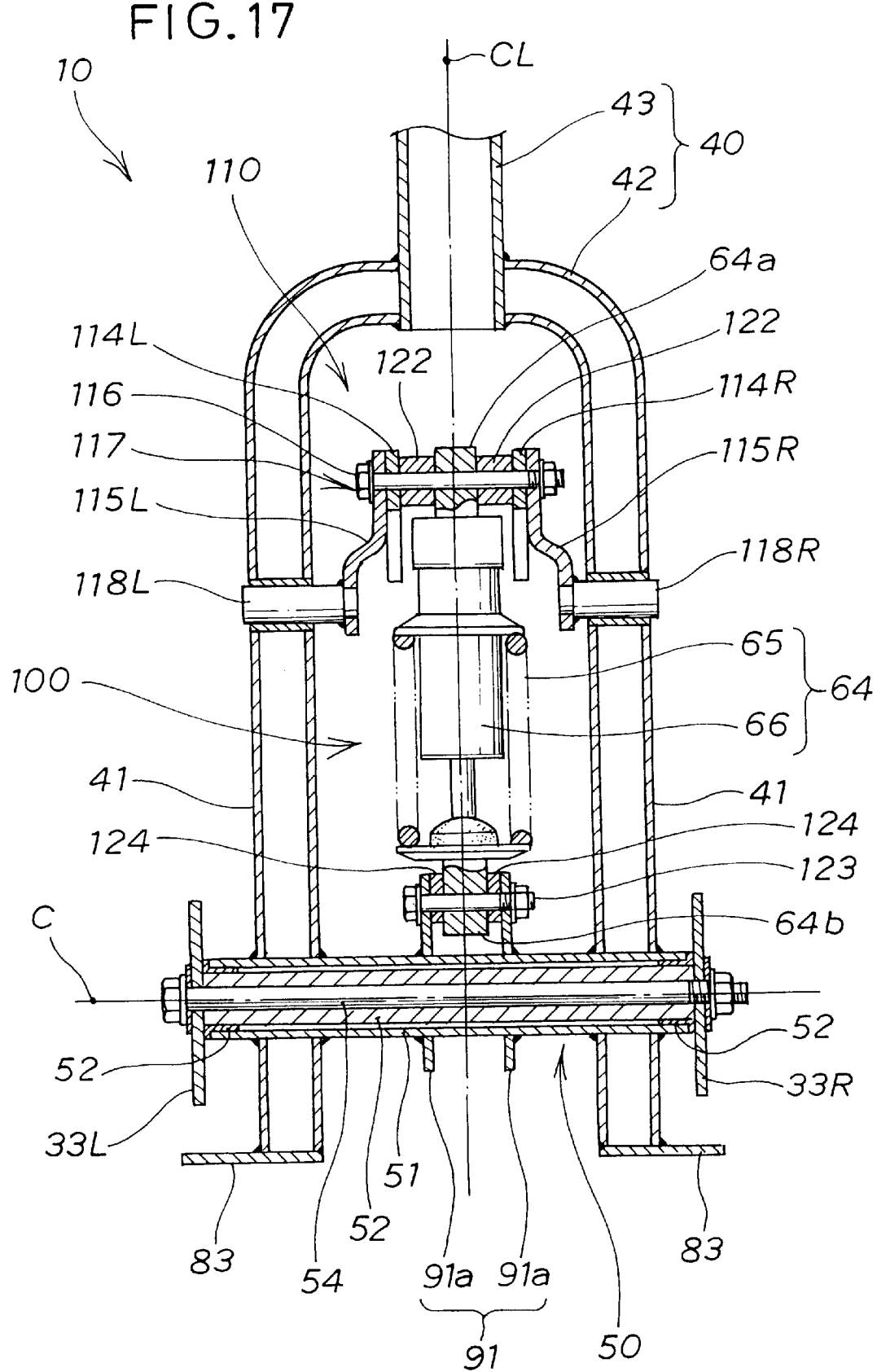
FIG. 17 is an enlarged cross-sectional view taken along line 17—17 of FIG. 14.

The rear ends of the first links 114R and 114L and the upper ends of the second links 115R and 115L are rotatably connected by the connecting bolt 116 as described above, and constitute a connection portion 117. The front end 64a of the damping member 64 is rotatably connected to the connecting bolt 116 of the connection portion 117. As shown in FIGS. 15 and 17, the other end 64b of the damping member 64 is rotatably fitted to a pair of right and left plates 91a and 91a by a connecting bolt 123 in such a manner as to be positioned in the upper portion between the plates 91a and 91a which are fixed to the cross pipe 51 of the pivot portion 50 and are spaced apart from each other. The two right and left plates 91a and 91a constitute the resistance-bar holding arm 91 which holds the resistance bar 93.

In FIGS. 15 and 16, reference numerals 121, 122 and 122 denote spacers for keeping constant the space between the right and left first links 114R and 114L. In FIG. 17, reference numerals 124 and 124 denote spacers for maintaining the other end 64b of the damping member 64 in the center between the plates 91a and 91a.

Figure 18A:
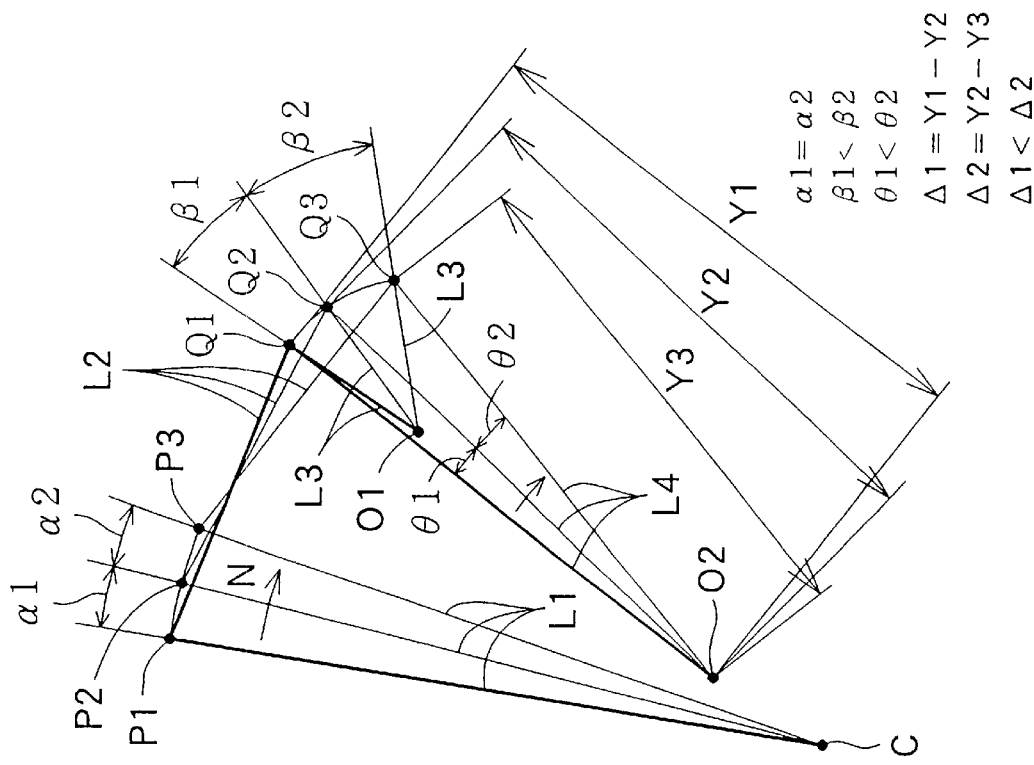
FIGS. 18A and 18B are views showing the principle of the suspension according to the second embodiment.
Figure 18B:
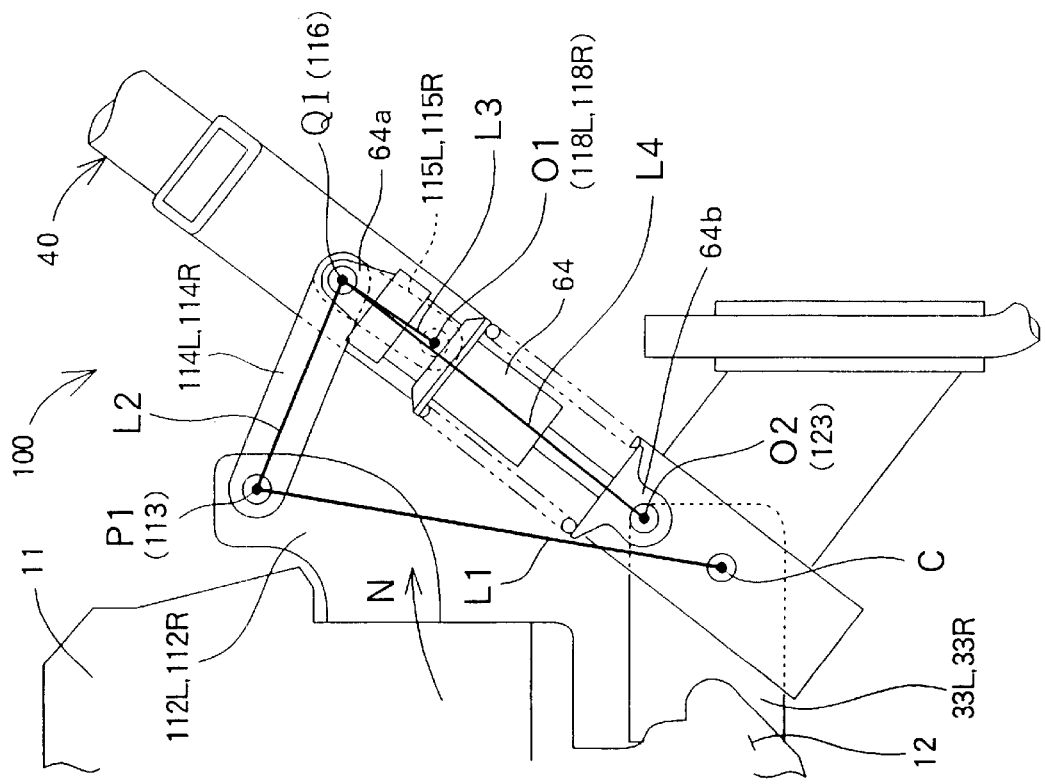

FIGS. 18A and 18B are views showing the principle of the suspension 100 according to the second embodiment.

In FIG. 18A, points C, P1, Q1, O1 and O2 and lines L1 to L4 are defined as follows:

C: center of swing of the manipulating handle 40;

P1: point at which the first links 114R and 114L are connected to the upper brackets 112R and 112L;

Q1: point at which the second links 115R and 115L and the front end 64a of the damping member 64 are connected to the first links 114R and 114L;

O1: point at which the second links 115R and 115L are connected to the manipulating handle 40;

O2: point at which the other end 64b of the damping member 64 is connected to the manipulating handle 40;

L1: line which connects the point C and the point P1;

L2: line which connects the point P1 and the point Q1;

L3: line which connects the point O1 and the point Q1; and

L4: line which connects the point O2 and the point Q1.

The lengths of the lines L1, L2 and L3 are constant. The line L3 is the shortest of all the lines L1, L2, L3 and L4, and the lengths of the lines L1, L2, L3 and L4 have the relation of L3<L2<L4<L1. The line L3 is nearly superposed on the line L4. The lines L1, L2 and L4 are arranged approximately in a triangle.

When the engine 11 and the power transmission mechanism 12 approaches the manipulating handle 40 while rotating about the point C in the clockwise direction as indicated by an arrow N, the line L1 also rotates about the point C in the direction of the arrow N.

In FIG. 18B, when the line L1 lies at its initial position on the point P1, the length of the line L4 is Y1. When the line L1 is swung by a swing angle α1 in the direction of the arrow N, the point P1 is displaced to the position of the point P2. As the point P1 is displaced, the point Q1 is displaced, and the line L3 rotates about the point O1 in the clockwise direction by a swing angle β1 and the point Q1 is displaced to the position of the point Q2. As the point Q1 is displaced, the line L4 rotates about the point O2 in the clockwise direction by a swing angle θ1. At this time, the length of the line L4 becomes Y2 which is shorter than the length Y1. (Y1−Y2) which is the difference between Y1 and Y2 is represented by Δ1.

The line L1 is further swung by a swing angle α2 in the direction of the arrow N. The swing angle α2 is equal to the swing angle α1. As the point P2 is displaced to the position of the point P3, the point Q2 is displaced to the position of the point Q3 and the line L3 rotates about the point O1 in the clockwise direction by a swing angle β2. As the point Q2 is displaced to the point Q3, the line L4 rotates about the point O2 in the clockwise direction by a swing angle θ2. At this time, the length of the line L4 is Y3 which is shorter than the length Y2. (Y1−Y2) which is the difference between Y2 and Y3 is represented by Δ2.

Since the length of the line L3 is shorter than that of the line L11, the swing angle of the line L3 becomes larger than the swing angle of the line L1. For example, if the swing angle of the line L1 is α1, the swing angle of the line L3 is β1. However, if the swing angle of the line L1 is α2 which is equal to the swing angle α1, the swing angle of the line L3 is β2 which is larger than β1. Accordingly, the swing angle θ1 of the line L4 becomes larger than the swing angle θ2. Therefore, Δ1 becomes larger than Δ1. The above description can be summarized as follows: if α1=α2, β1<β2 and θ1<θ2, so that Δ1<Δ2.

In the suspension 100 shown in FIG. 18A, as the engine 11 and the power transmission mechanism 12 in the direction in which they approach the manipulating handle 40, the proportion of the stroke of the damping member 64 per predetermined amount of swing varies to a great extent. The suspension 100 which performs this operation can be regarded as a progressive suspension. When the engine 11 and the power transmission mechanism 12 swing by the swing angle α1 or α2, the damping member 64 becomes shorter by a length equivalent to Δ1 or Δ2.

Figure 19:
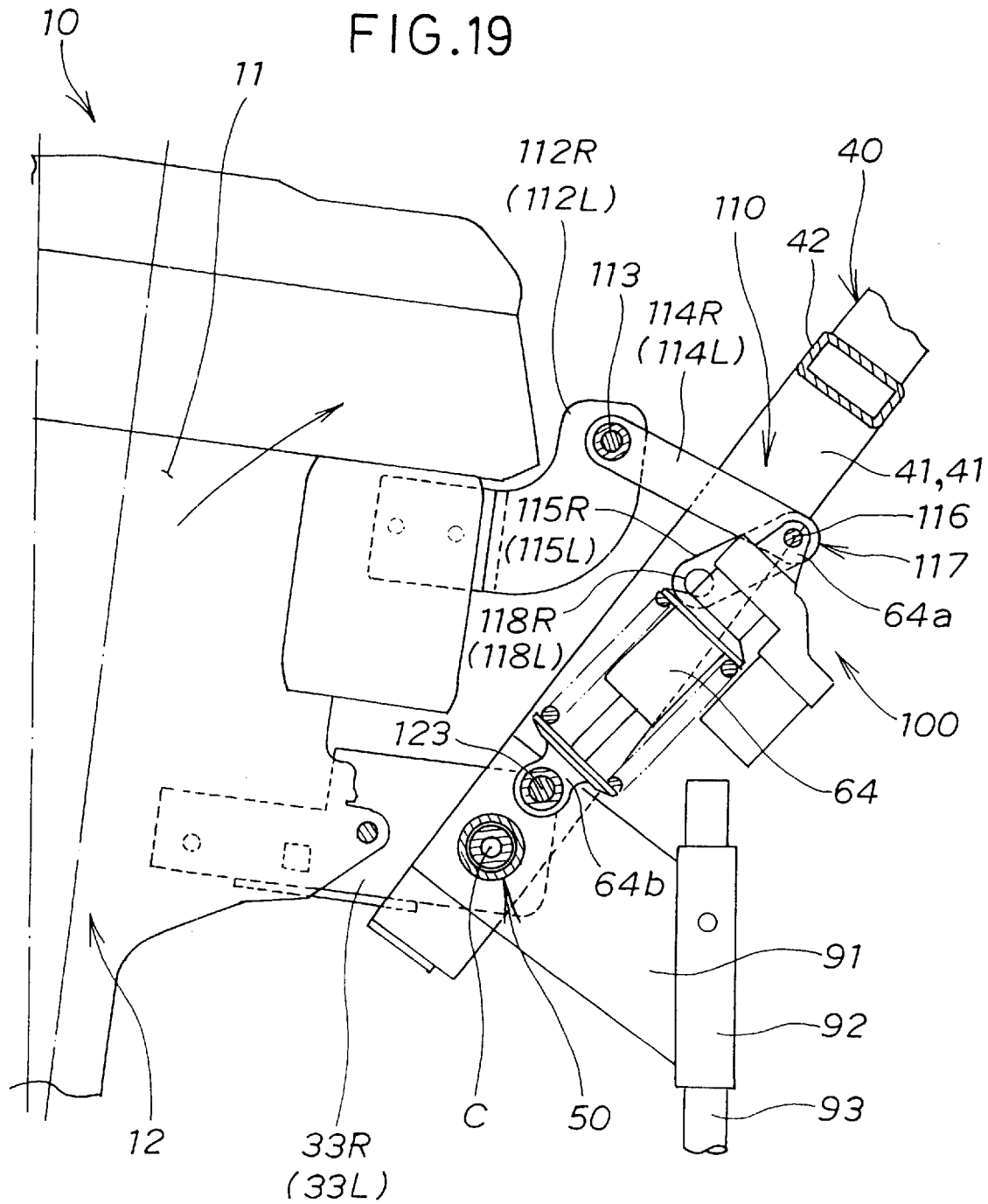
FIG. 19 is a view of the operation of the fitting structure of the manipulating handle according to the second embodiment.

During tilling work with the small-sized tiller 10, if the small-sized tiller 10 encounters a bounding phenomenon, shock energy due to the bounding phenomenon acts on the engine 11 and the power transmission mechanism 12 as an upward force. As shown in FIG. 19, the engine 11 and the power transmission mechanism 12 swing upward with respect to the manipulating handle 40, whereby the shock energy is absorbed.

The shock energy acts on the front end 64a of the damping member 64 from the engine 11 via the upper brackets 112R and 112L, the connecting bolt 113, the first links 114R and 114L and the connecting bolt 116. The damping member 64 fully absorbs the shock energy by shrinking rearwardly by a stroke which corresponds to the magnitude of the shock energy.

In particular, since the suspension 100 is a progressive suspension, the damping member 64 absorbs a small shock energy with a small stroke and a large shock energy with a large stroke. Accordingly, the damping member 64 effectively absorbs the shock energy and facilitates tilling work.

Moreover, the stroke of the damping member 64 can be made large by appropriately setting the proportion of the lengths of the second links 115R and 115L to those of the first links 114R and 114L in the link mechanism 110, whereby the shock energy can be absorbed to a further extent by the damping member 64.

In the second embodiment shown in FIGS. 14 to 19, the first links 114R and 114L may be fitted to the power transmission mechanism 12 instead of to the engine 11. Moreover, the resistance bar 93 may be extended downwardly from the rear of the power transmission mechanism 12.

A small-sized tiller according to a third embodiment of the present invention will be described below with reference to FIGS. 20 to 28.

Figure 20:
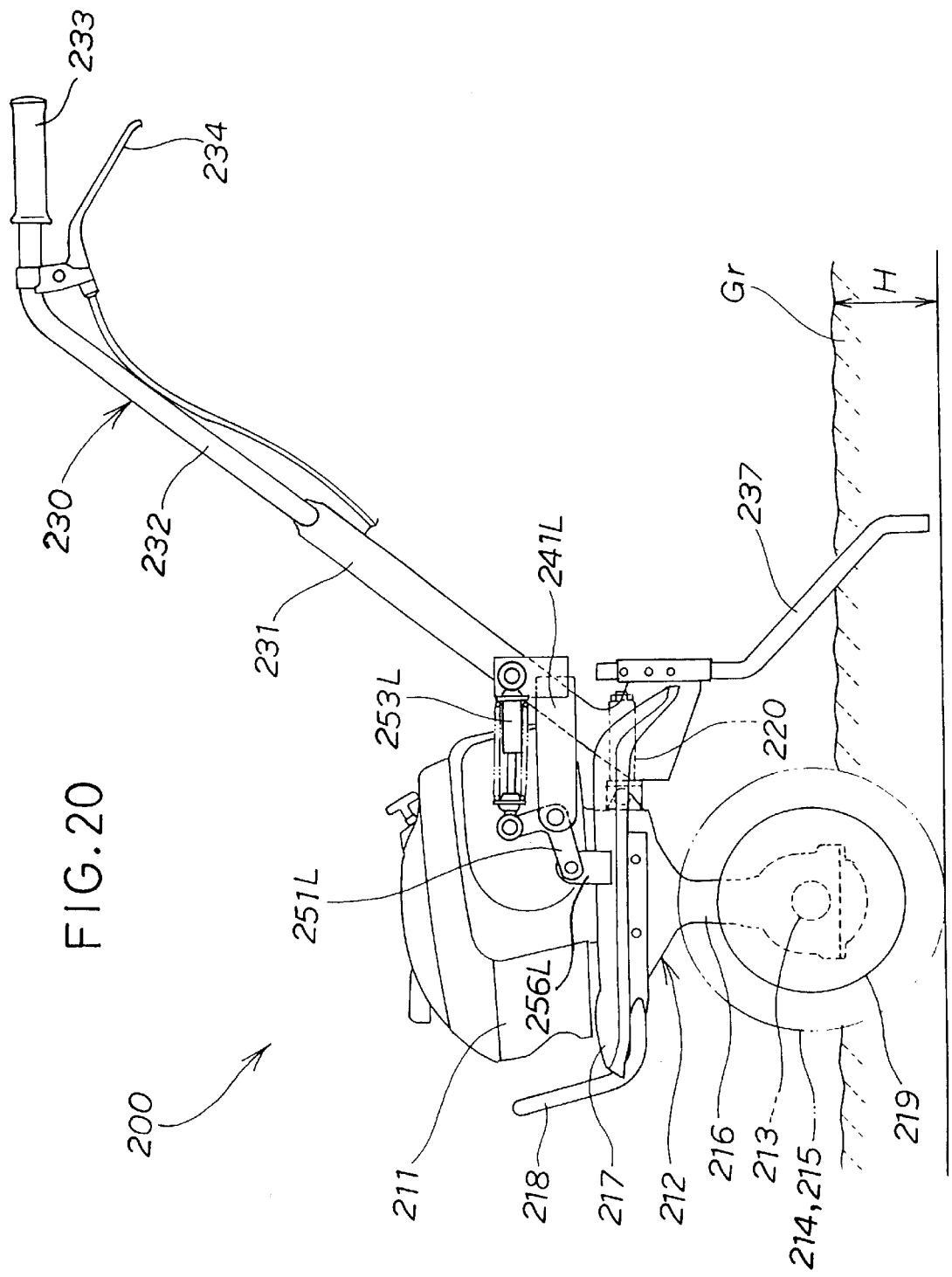
FIG. 20 is a side view showing the whole of a small-sized tiller according to a third embodiment of the present invention.
Figure 21:
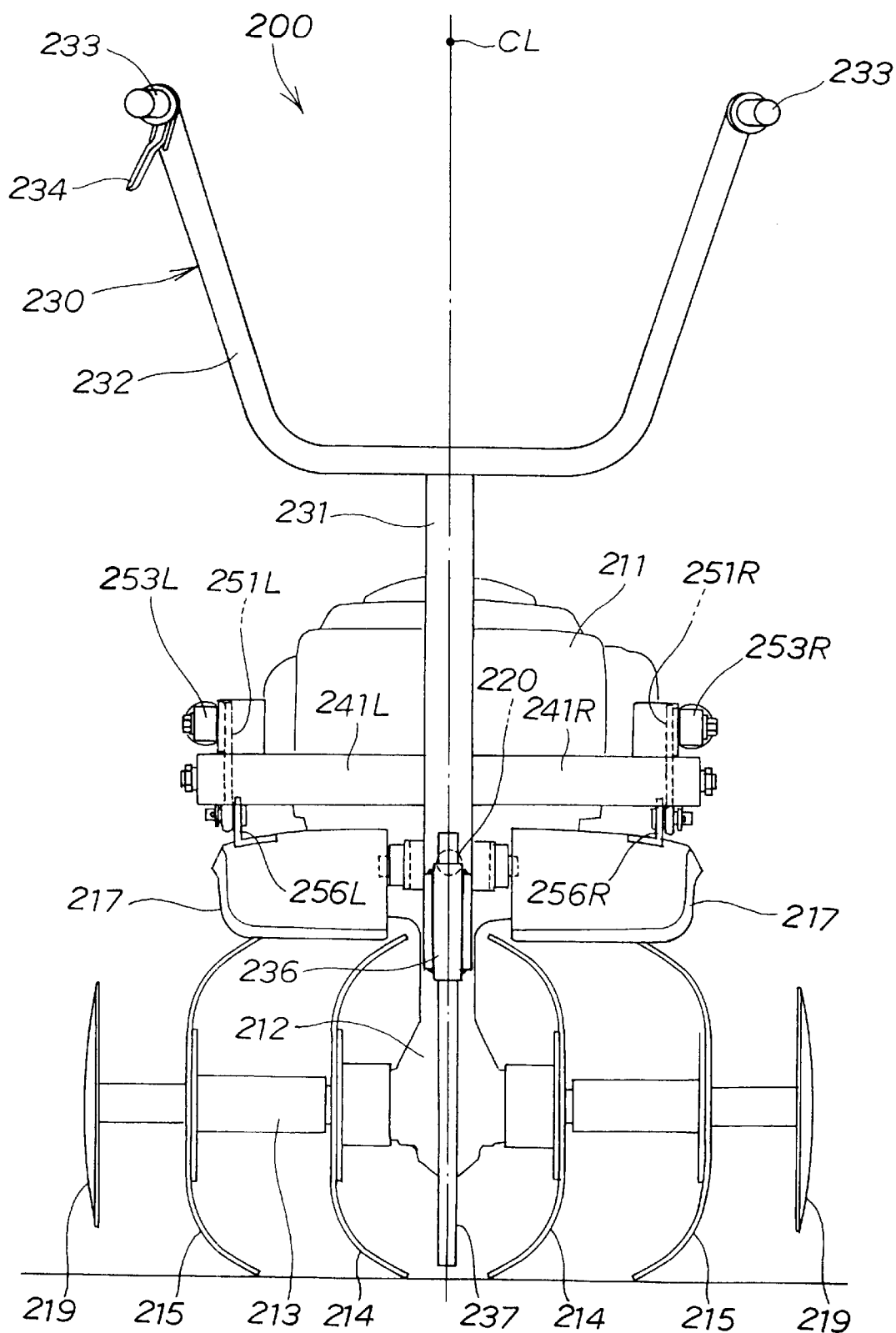
FIG. 21 is a rear view of the small-sized tiller shown in FIG. 20.
Figure 22:
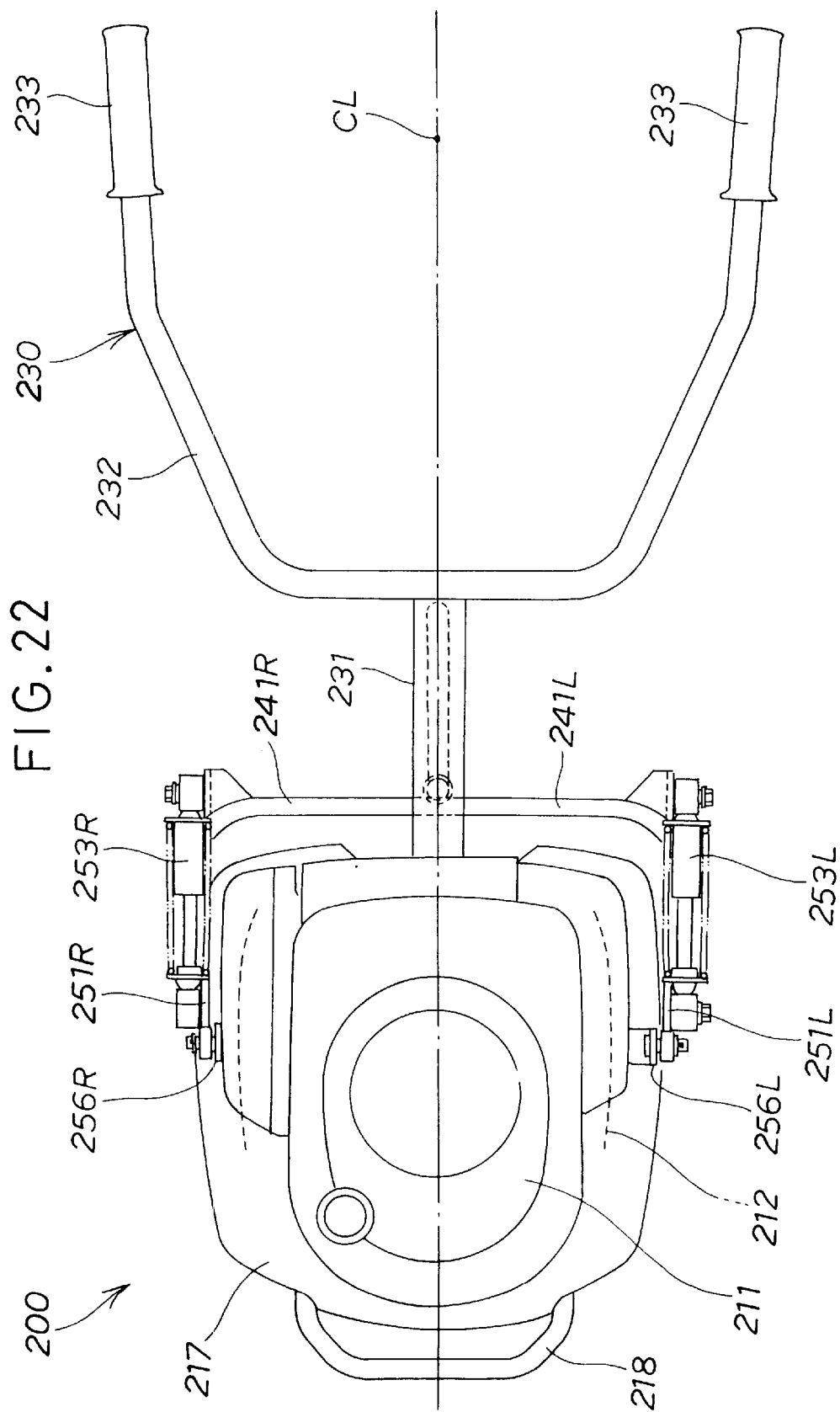
FIG. 22 is a plan view of the small-sized tiller shown in FIG. 20.

Referring to FIGS. 20, 21 and 22, a small-sized tiller 200 according to the third embodiment is provided with an engine 211 as a power source. The driving force outputted from the engine 211 rotates a tilling shaft 213 via a power transmission mechanism 212. Plural tilling claws 214 and 215 are fitted to the tilling shaft 213 in the state of being spaced apart from one another at predetermined intervals. The small-sized tiller 200 runs while tilling ground by means of the rotation of the tilling claws 214 and 215.

The small-sized tiller 200 has a manipulating handle 230 which is fitted to the rear of the power transmission mechanism 212 via a pivot 220. This manipulating handle 230 extends upwardly rearwardly from the power transmission mechanism 212. A resistance bar 237 is fitted to the manipulating handle 230 in such a manner as to extend downwardly from the lower portion of the manipulating handle 230.

The power transmission mechanism 212 is a mechanism which transmits the driving force of the engine 211 to the tilling shaft 213, and has plural gears (not shown) which are built in a case 216. The resistance bar 237 is inserted into the ground Gr to set the tilling depth H for the first and second tilling claws 214 and 215, and produces resistance forces against the advancing forces of the tilling claws 214 and 215. In FIGS. 20, 21 and 22, reference numeral 217 denotes a cover for blocking the splashing of mud or the like, reference numeral 218 a vehicle-body guard, reference numeral 233 a grip, and reference numeral 234 a clutch lever.

As shown in FIG. 21, the engine 211 is disposed along the vehicle-body center line CL. The power transmission mechanism 212 is fitted to the lower portion of the engine 211. The tilling shaft 213 is fitted to the lower portion of the power transmission mechanism 212 in such a manner as to extend in the width direction of the tiller 200. The plural tilling claws 214 and 215 include the first tilling claws 214 and 214 which are respectively disposed at inward positions adjacent to the vehicle-body center line CL, and the second tilling claws 215 and 215 which are respectively disposed at positions outward of the first tilling claws 214 and 214. The plural tilling claws 214 and 215 are fitted to the tilling shaft 213 in such a manner as to be arranged at an equal interval in the longitudinal direction of the tilling shaft 213.

The manipulating handle 230 is made of a handle post part 231 which is fitted to the rear of the power transmission mechanism 212 along the vehicle-body center line CL, and a handle part 230 of approximately U-like shape which is fixed to the top end of the handle post part 321. In FIGS. 20, 21 and 22, reference numerals 219 and 219 denote side disks.

Figure 23:
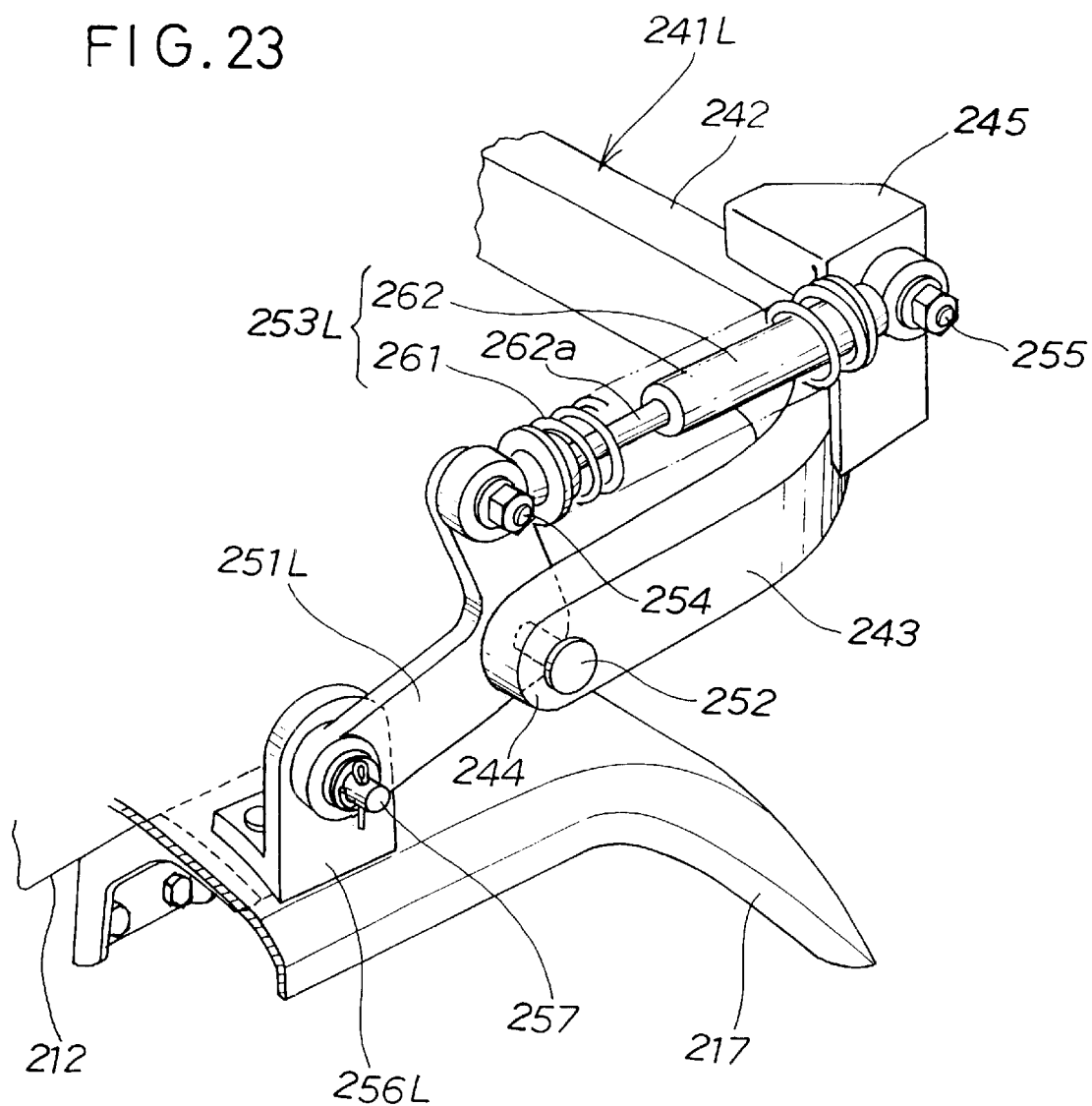
FIG. 23 is a perspective view showing the left-side connection structure among an arm, a link bracket and a damping member which are centered about an L-shaped link.

Referring to FIGS. 22 and 23, a pair of right and left damping members 253R and 253L are provided between the power transmission mechanism 212 and the manipulating handle 230. These damping members 253R and 253L reduce shock which occurs due to the rightward or leftward rotation of the power transmission mechanism 212 about the pivot 220 (refer to FIG. 20) when the right or left tilling claw 214 or 215 strikes on a stone or the like buried in ground.

A pair of right and left arms 241R and 241L extend from the manipulating handle 230 to the right and left sides of the power transmission mechanism 212, respectively. A pair of right and left L-shaped links 251R and 251L are rotatably connected to the end portions of the respective right and left arms 241R and 241L. Each of the right and left arms 241R and 241L has an approximately U-like shape which is opened toward the front. Since the right damping member 253R and the right L-shaped link 251R are the same in construction as the left damping member 253L and the left L-shaped link 251L, only one of the right- and left-side constructions will be described below as shown in detail in FIG. 23.

Referring to FIG. 23, the left arm 241L has a first arm portion 242 extending leftwardly from the manipulating handle 230 shown in FIG. 22. The first arm portion 242 has a second arm portion 243 which is bent from the left end of the first arm portion 242 and extends toward the front. The corner portion of the L-shaped link 251L is rotatably connected to an arm end portion 244 which is the end portion of the second arm portion 243. A bracket 245 which extends upwardly from the corner portion between the first arm portion 242 and the second arm portion 243 is fitted to the left arm 241L.

One end of the L-shaped link 251L is rotatably fitted to the power transmission mechanism 212 by a pin 257 via a link bracket 56L. The other end of the L-shaped link 251L is rotatably connected by a pin 254 to the point of a rod 262a of an oil damper 262 provided with a coil spring 261 which constitutes the damping member 253L. The proximal end of the oil damper 262 is rotatably connected to the bracket 245 by a pin 255. The coil spring 261 at all times urges the L-shaped link 251L to rotate about a pin 252 in the counterclockwise direction.

The connection structure among the power transmission mechanism 212, the pivot 220 and the manipulating handle 230 will be described below with reference to FIGS. 24 and 25.

The pivot 220 is provided between the manipulating handle 230 and the power transmission mechanism 212 in such a manner as to extend toward the front and the rear of the small-sized tiller 200 along the vehicle-body center line CL. Accordingly, the power transmission mechanism 212 makes a rightward or leftward rotation (i.e., swings rightwardly or leftwardly) about the pivot 220 with respect to the manipulating handle 230.

Figure 24:
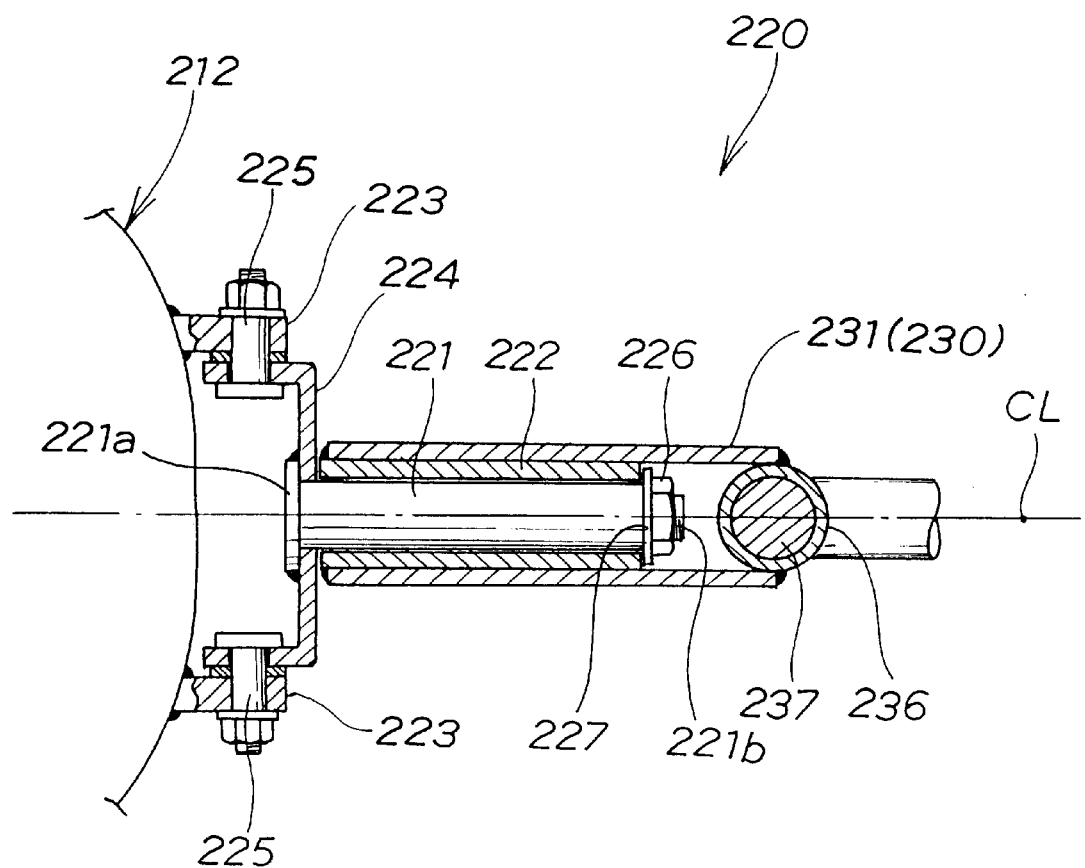
FIG. 24 is a cross-sectional view showing a connection structure centered about a pivot provided between the rear of a power transmission mechanism and the manipulating handle.

As shown in FIG. 24, the pivot 220 is made of a horizontal pivot shaft 221 which extends rearwardly from the rear of the power transmission mechanism 212 and a pivot pipe 222 in which the pivot shaft 221 is rotatably fitted. As also shown in FIG. 25, the pivot pipe 222 is fixed to the lower portion of the forked portion of the handle post part 231. In this manner, the lower portion of the manipulating handle 230 is pivotally connected directly to the rear portion of the power transmission mechanism 212.

A pair of right and left brackets 223 and 223 are fixed in such a manner to be spaced apart from each other and extend rearwardly from the rear of the power transmission mechanism 212. A pivot shaft fitting member 224 to which the pivot shaft 221 is fitted is fixed between this one pair of brackets 223 and 223 by fitting pins 225 and 225 on the right and left sides. The pivot shaft 221 has a large-diameter flange portion 221a at its front end, and is engaged with the pivot shaft fitting member 224 at the large-diameter flange portion 221a. The pivot shaft 221 has a bolt portion 221b at its rear end, and a washer 227 having approximately the same diameter as the pivot pipe 222 is fitted to the bolt portion 221b by a nut 226. The washer 227 prevents the pivot shaft 221 from coming off the pivot pipe 222.

The pivot 220 has the above-described construction, and the engine 211 and the power transmission mechanism 212 are capable of rotating about the pivot 220 rightwardly or leftwardly with respect to the manipulating handle 230.

Figure 25:
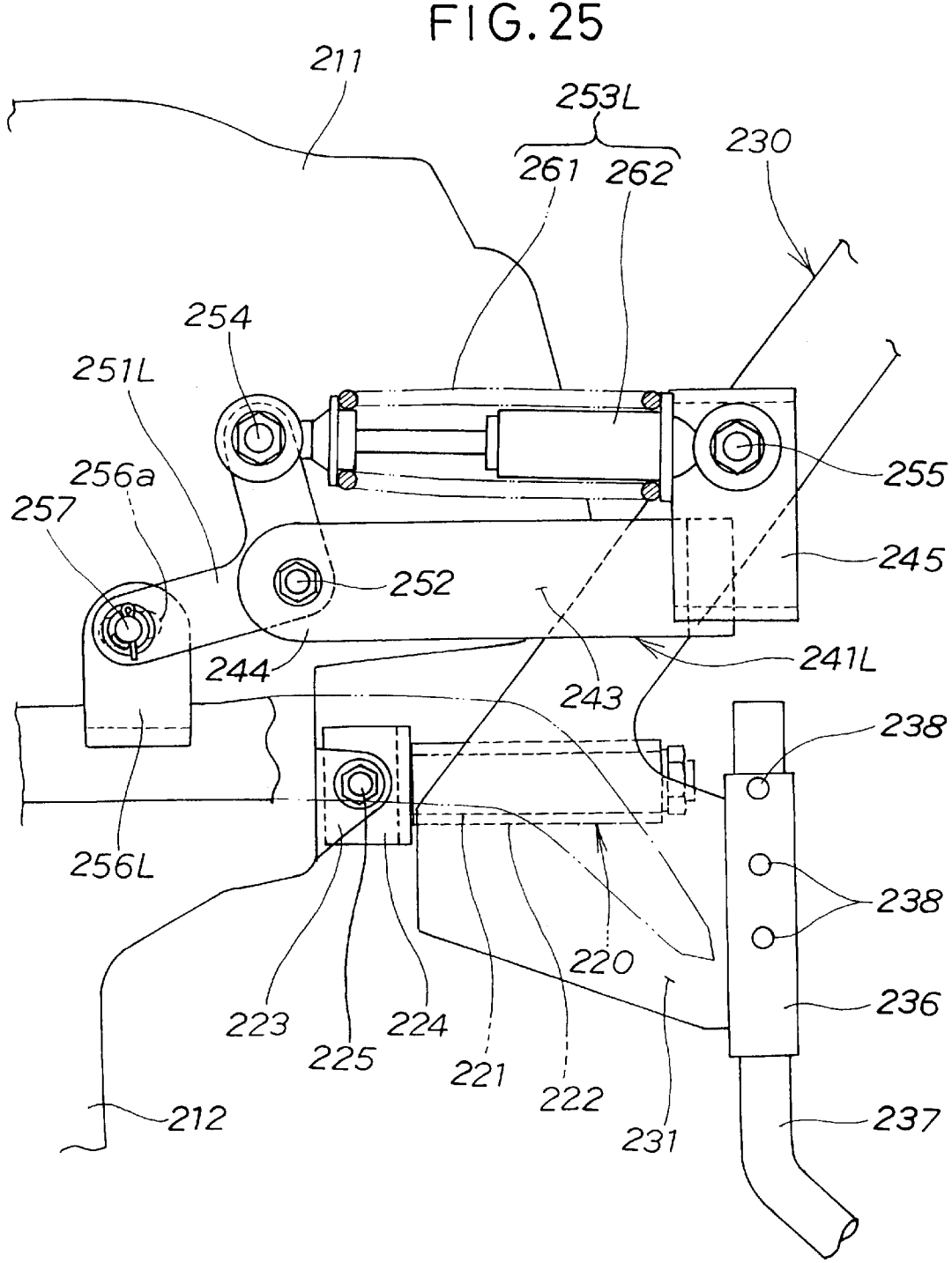
FIG. 25 is an enlarged view of the pivot, the arm, the L-shaped link and a peripheral portion of the damping member, all of which are shown in FIG. 20.

When the power transmission mechanism 212 rotates (swings) rightwardly or leftwardly with respect to the manipulating handle 230 as viewed from an operator, the locus of movement of a link bracket 256L draws an upward or downward straight line as viewed in FIG. 25, whereas the locus of swing of the left L-shaped link 251L about the pin 252 draws an arc. To maintain smooth connection at the pin 257 even during this time, a pin hole 256a is formed in the link bracket 256L in the shape of a horizontally long slot so that the L-shaped link 251L can make a smooth rotation.

Referring to FIG. 25, a vertically extending pipe-shaped holding portion 236 is fitted to the lower rear end of the handle post part 231 along the vehicle-body center line CL. The resistance bar 237 is fitted in the holding portion 236. The resistance bar 237 is secured to the holding portion 236 by plural securing bolts 38.

Figure 26:
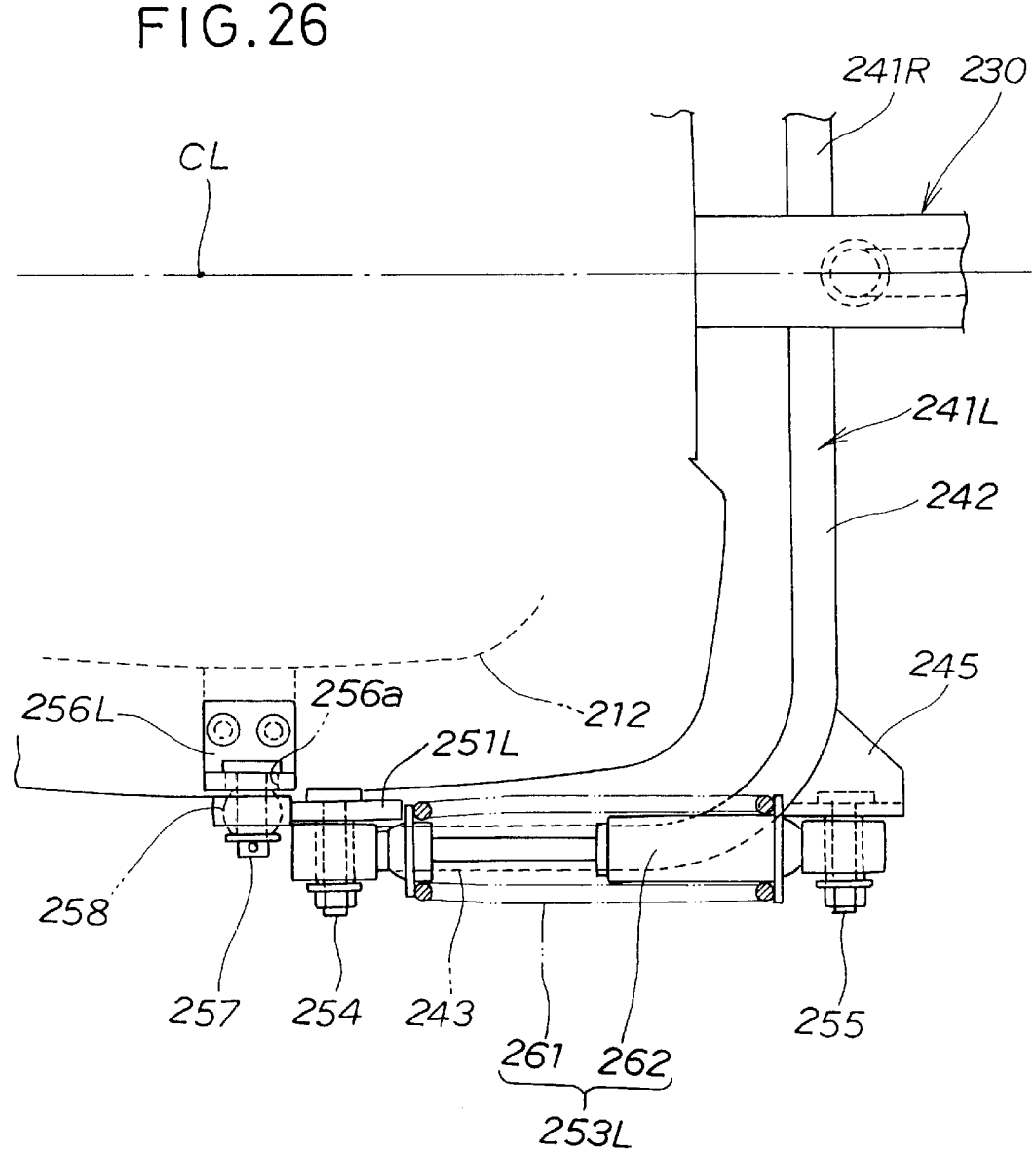
FIG. 26 is a plan view similar to the perspective view of FIG. 23.

As shown in FIG. 26, when the power transmission mechanism 212 rotates (swings) rightwardly or leftwardly with respect to the manipulating handle 230 as viewed from the operator, for example, the link bracket 256L fitted to the power transmission mechanism 212 inclines in the rotating direction with respect to the left L-shaped link 251L. To maintain smooth connection at the pin 257 even during this time, the left L-shaped link 251L and the link bracket 256L are connected to each other by the pin 257 via an aligning member 258 such as a self-aligning ball bearing.

The connection structure among the left arm 241L, the L-shaped link 251L, the damping member 253L and the link bracket 256L has been described above with reference to FIGS. 23 to 26, but since the connection structure among the right arm 241R, the L-shaped link 251R, the damping member 253R and the link bracket 256R has a similar construction, the description of the same construction is omitted.

The operation of the small-sized tiller 200 according to the third embodiment will be described below with reference to FIGS. 20, 27 and 28.

Referring to FIG. 20, after the engine 211 has been started, the operator (not shown) grips the manipulating handle 230 and starts walking while steering the small-sized tiller 200. The tiller 200 advances and tills ground while rotating the first and second tilling claws 214 and 215 by means of the power transmission mechanism 212 and the tilling shaft 213 by the driving force of the engine 211.

The operator can insert the resistance bar 237 integral with the manipulating handle 230 into the ground Gr by applying a downward manipulating force to the manipulating handle 230. The resistance bar 237 which is inserted in the ground Gr has a resistance force in a direction perpendicular to the axis of the resistance bar 237. Owing to this resistance force, the manipulating handle 230 and the resistance bar 237 exhibit stability in the forward, rearward, rightward and leftward directions of the small-sized tiller 200. The manipulating force required to force the manipulating handle 230 forwardly is nearly constant. The resistance bar 237 sets the tilling depth H for the first and second tilling claws 214 and 215, and applies resistance forces against the tractive forces of the first and second tilling claws 214 and 215 to the small-sized tiller small-sized tiller 200.

FIG. 27 is a view showing the state in which during tilling work, the right second tilling claw 215 strikes on the solid object B such as a stone buried in ground and the engine 211 and the power transmission mechanism 212 is rotated about the pivot 220 and inclined in the counterclockwise direction with respect to the manipulating handle 230.

As shown in FIG. 27, if the right second tilling claw 215 strikes on the solid object B such as a stone buried in ground, a bounding phenomenon (also called a dashing phenomenon) occurs due to a tilling reaction force. Shock energy which serves as the tilling reaction force at this time conducts to the engine 211 and the power transmission mechanism 212 from the right second tilling claw 215 via the tilling shaft 213.

Since the resistance bar 237 which extends downwardly from the manipulating handle 230 is inserted in the ground Gr, the resistance bar 237 has a resistance force against the bounding phenomenon. Accordingly, the manipulating handle 230 and the resistance bar 237 are unsusceptible to the influence of the bounding phenomenon.

The engine 211 and the power transmission mechanism 212 swing about the pivot 220 in the counterclockwise direction with respect to the manipulating handle 230 owing to the shock energy. In other words, although the handle center line HL of the manipulating handle 230 extends nearly vertically, the vehicle-body center line CL inclines leftwardly so that the shock energy can be absorbed. In addition, since the manipulating handle 230 does not bound nor incline, the steering performance of the small-sized tiller 200 is stable.

When the small-sized tiller 200 is tilling an uneven arable land, the amount of tilling by the left first and second tilling claws 214 and 215 differs from the amount of tilling by the right first and second tilling claws 214 and 215, so that the right and left tilling reaction forces differ from each other. However, since the resistance bar 237 which extends downwardly from the manipulating handle 230 is inserted in the ground Gr, the resistance bar 237 is in a stable state and the manipulating handle 230 is stable. Since the engine 211 and the power transmission mechanism 212 rotate (swing) about the pivot 220 rightwardly or leftwardly with respect to the manipulating handle 230 owing to the right and left different tilling reaction forces, it is possible to absorb the right and left different tilling reaction forces. Since the manipulating handle 230 is stable without bounding or inclining, the operator can maintain the rectilinear running of the small-sized tiller 200 by steering the small-sized tiller 200 while retaining the balance between the right and left portions of the small-sized tiller 200.

(a) of FIG. 28 shows the operations of the left link bracket 256L, the L-shaped link 251L and the damping member 253L during the state shown in FIG. 27. During this state, the left link bracket 256L is moved down and the left L-shaped link 251L is rotated about the pin 252 in the counterclockwise direction, whereby the rod 262a of the left damping member 253L advances.

(b) of FIG. 28 shows the operations of the right link bracket 256R, the L-shaped link 251R and the damping member 253R during the state shown in FIG. 27. During this state, the right link bracket 256R is moved up and the right L-shaped link 251R is rotated about the pin 252 in the clockwise direction, whereby the rod 262a of the right damping member 253R is retracted. In this manner, the right damping member 253R absorbs shock energy by shrinking by a stroke which corresponds to the magnitude of the shock energy.

Referring back to FIG. 27, if the left first or second tilling claws 214 or 215 strikes on the solid object B such as a stone buried in ground, the vehicle-body center line CL inclines toward the right. During this state, the left link bracket 256L shown in (a) of FIG. 28 is moved up and the left L-shaped link 251L is rotated about the pin 252 in the clockwise direction, whereby the rod 262a of the left damping member 253L is retracted. Thus, shock energy is absorbed by the damping member 253L. At the same time, the right link bracket 256R shown in (b) of FIG. 28 is moved up and the right L-shaped link 251R is rotated about the pin 252 in the counterclockwise direction, whereby the rod 262a of the right damping member 253R is projected.

In this manner, the small-sized tiller 200 according to the third embodiment converts the right or left rotating (swinging) motion of the engine 211 and the power transmission mechanism 212 into a forward or rearward rotating motion through the pair of right and left L-shaped links 251R and 251L, and transmits the forward or rearward rotating motion to the pair of right and left damping members 253R and 253L.

Specifically, upward shock energy which occurs owing to the right and left rotation (swing) of the engine 211 and the power transmission mechanism 212 is converted into rearward shock energy through the L-shaped links 251R and 251L, whereby the shock energy is reduced by the damping members 253R and 253L.

In this manner, the small-sized tiller 200 according to the third embodiment converts the direction of rotating (swinging) motion through the right and left L-shaped links 251R and 251L. As compared with the case where the right and left winging motion of the engine 211 and the power transmission mechanism 212 is directly to the right and left damping members 253R and 253L, the tiller according to the third embodiment makes it possible to freely set the projecting/retracting strokes and arrangements of the respective rods 262a of the damping members 253R and 253L, thereby increasing the degree of freedom of design. In addition, since the right and left damping members 253R and 253L can be arranged so that they can be compressed and expanded toward the front and the rear of the vehicle body, the small-sized tiller 200 provided with the right and left damping members 253R and 253L can be made far more compact.

Moreover, as shown in (a) and (b) of FIG. 28, if the distance from the pin 252 to the pin 254 positioned at the other end of each of the right and left L-shaped links 251R and 251L is set longer than the distance from the pin 252 provided at the bent portion of each of the right and left L-shaped links 251R and 251L to the pin 257 positioned forwardly of the pin 252, it is possible to increase the amount of forward and rearward displacement of the pin 254. It is, therefore, possible to absorb shock energy to a further extent by increasing the respective strokes of the right and left damping members 253R and 253L according to the increases in the amounts of forward and rearward displacements of the respective pins 254.

In the third embodiment, the small-sized tiller 200 needs only to have a construction which enables the portion forward of the pivot 220 to swing toward the right and the left 220 with respect to the manipulating handle 230 as viewed from the operator. For example, the manipulating handle 230 may be fitted to the rear of the engine 211 via the pivot 220. Moreover, the pivot 220 may also have a construction in which a pivot shaft 221 provided on the handle post part 231 is rotatably fitted in a pivot pipe 222 provided on the rear of the engine 211 or the power transmission mechanism 212.

Furthermore, the small-sized tiller 200 may have the following construction: the pair of right and left arms 241R and 241L are respectively extended from the manipulating handle 230 to the right and left sides of the engine 211, and the right and left sides of the engine 211 are respectively connected to the ends of the pair of right and left arms 241R and 241L by the pair of right and left L-shaped links 251R and 251L, and the pair of right and left damping members 253R and 253L are respectively interposed between the manipulating handle 230 and the pair of right and left L-shaped links 251R and 251L so that the rightward or leftward swinging motion of the power source 211 can be converted into a forward or rearward swinging motion through the pair of right and left L-shaped links 251R and 251L.

Although the above description of each of the first, second and third embodiments has referred to an engine as the power source 11, the present invention is not limited to only an engine, and may also use an electric motor.

What is claimed is:

1. A small-sized tiller comprising:
   a power source for generating a rotational driving force;
   a tilling shaft;
   a power transmission mechanism for transmitting the rotational driving force of the power source to the tilling shaft;
   a plurality of tilling claws for tilling the ground and connected to the tilling shaft for undergoing rotation therewith;
   a resistance bar for insertion into the ground during tilling of the ground by the tilling claws to generate resistance forces for countering driving forces generated during rotation of the tilling claws;
   a manipulating handle for guiding the tiller and having a lower portion pivotally connected directly to a rear portion of the power source or directly to a rear portion of the power transmission mechanism so that shock energy which is generated when the tilling claws strike a hard solid object during tilling of the ground and which is transmitted to the power source or the power transmission mechanism is absorbed by pivotal movement of the power source or the power transmission mechanism relative to the manipulating handle about a pivot point; and a damping member disposed between the power source or the power transmission mechanism and the manipulating handle for damping shock energy generated when the manipulating handle undergoes pivotal movement in the upward and downward directions relative to the power source or the power transmission mechanism, the damping member having a first end pivotally connected to a portion of the power source or a portion of the power transmission mechanism and a second end opposite the first end and pivotally connected to a portion of the manipulating handle.

2. A small-sized tiller according to claim 1; wherein the resistance bar extends downwardly from the manipulating handle.

3. A small-sized tiller according to claim 1; wherein the resistance bar extends downwardly from the rear portion of the power transmission mechanism.

4. A small-sized tiller comprising: a power source for generating a rotational driving force; a tilling shaft; a power transmission mechanism for transmitting a rotational driving force of the power source to the tilling shaft; a plurality of tilling claws for tilling the ground and connected to the tilling shaft for undergoing rotation therewith; a resistance bar for insertion into the ground during tilling of the ground by the tilling claws to generate resistance forces for countering driving forces generated during rotation of the tilling claws; a manipulating handle pivotally connected to the power source or the power transmission mechanism for guiding the tiller; a first link connected to a rear portion of the power source or a rear portion of the power transmission mechanism for undergoing upward and downward pivotal movement; a second link connected to the manipulating handle for undergoing forward and rearward pivotal movement, the first link being connected to the second link to constitute a link mechanism which undergoes pivotal movement in accordance with a forward or rearward pivotal movement of the power source or the power transmission mechanism; and a damping member for damping shock energy generated during pivotal movement of the power source or the power transmission mechanism, the damping member having a first end pivotally connected between the first and second links and a second end pivotally connected to the manipulating handle so that a pivoting stroke of the damping member is maximized when the power source or the power transmission mechanism pivots in a direction toward the manipulating handle.

5. A small-sized tiller comprising: a power source for generating a rotational driving force; a tilling shaft; a power transmission mechanism for transmitting a rotational driving force of the power source to the tilling shaft; a plurality of tilling claws for tilling the ground and connected to the tilling shaft for undergoing rotation therewith; a resistance bar for insertion into the ground during tilling of the ground by the tilling claws to generate resistance forces for countering driving forces generated during rotation of the tilling claws; a manipulating handle pivotally connected to the power source or the power transmission mechanism for guiding the tiller, the manipulating handle having a portion disposed forwardly of a pivot point of the manipulating handle and mounted for undergoing pivotal movement in rightward and leftward directions with respect to a moving direction of the tiller; and a pair of right and left damping members disposed between the power source or the power transmission mechanism and the manipulating handle for damping shock energy generated during pivotal movement of the portion of the manipulating handle in the rightward and leftward directions.

6. A small-sized tiller according to claim 5; further comprising a pair of right and left arms extending from the manipulating handle toward respective right and left sides of the power source or respective right and left sides of the power transmission mechanism, the right and left sides of the power source or the right and left sides of the power transmission mechanism being connected to respective ends of the pair of right and left arms by a pair of respective right and left links; and wherein the pair of right and left damping members are disposed between the pair of right and left links and the manipulating handle.

7. A small-sized tiller according to claim 5; wherein the resistance bar extends downwardly from the manipulating handle.

8. A tiller comprising: a plurality of rotational blades for tilling the ground; a power source for generating a rotational driving force to rotate the rotational blades and for advancing the tiller unidirectionally while tilling the ground; a power transmission mechanism for transmitting the rotational driving force of the power source to the rotational blades; a handle for guiding the tiller, the handle being pivotally connected at a lower portion thereof directly to a rear portion of the power source or directly to a rear portion of the power transmission mechanism so that shock energy which is generated when the rotational blades strike a hard solid object during tilling of the ground and which is transmitted to the power source or the power transmission mechanism is absorbed by pivotal movement of the power source or the power transmission mechanism relative to the handle about a pivot point; and a damping member disposed between the power source or the power transmission mechanism and the handle for damping the relative pivotal movement between the power source or the power transmission mechanism and the handle about the pivot point, the damping member having a first end pivotally connected to a portion of the power source or a portion of the power transmission mechanism and a second end opposite the first end and pivotally connected to a portion of the handle.

9. A tiller according to claim 8; wherein the handle is inclined rearwardly with respect to the direction of advancement of the tiller and extends upwardly from the power source.

10. A tiller according to claim 8; further comprising means for setting a tilling depth of the rotational blades in the ground and for generating resistance forces for countering a driving force of the rotational blades in the direction of advancement of the tiller during tilling of the ground.

11. A tiller according to claim 10; wherein the means for setting the tilling depth and for generating resistance forces comprises a bar extending from the handle and having an end for insertion into the ground during tilling of the ground.

12. A tiller according to claim 10; wherein the means for setting the tilling depth and for generating resistance forces comprises a bar extending from the power transmission mechanism and having an end for insertion into the ground during tilling of the ground.

13. A tiller comprising: a plurality of rotational blades for tilling the ground; a power source for generating a rotational driving force to rotate the rotational blades and for advancing the tiller unidirectionally while tilling the ground; a power transmission mechanism for transmitting a rotational driving force of the power source to the rotational blades; a handle for guiding the tiller, the handle being pivotally connected to the power source or the power transmission mechanism at a pivot point so that shock energy generated during tilling of the ground and transmitted to the power source or the power transmission mechanism is absorbed by relative pivotal movement between the power source or the power transmission mechanism and the handle about the pivot point; a first link connected to a rear portion of the power source or a rear portion of the power transmission mechanism for undergoing upward and downward pivotal movement; and a second link connected to the handle for undergoing forward and rearward pivotal movement, the first link being connected to the second link to constitute a link mechanism for undergoing pivotal movement in accordance with a forward or rearward pivotal movement of the power source or the power transmission mechanism.

14. A tiller according to claim 13; further comprising a damping member for damping shock energy generated during pivotal movement of the power source or the power transmission mechanism, the damping member having a first end pivotally connected between the first and second links and a second end pivotally connected to the handle so that a pivoting stroke of the damping member is maximized when the power source or the power transmission mechanism pivots in a direction toward the handle.

15. A small-sized tiller comprising: a power source for generating a rotational driving force; a tilling shaft; a power transmission mechanism for transmitting a rotational driving force of the power source to the tilling shaft; a plurality of tilling claws for tilling the ground and connected to the tilling shaft for undergoing rotation therewith; a resistance bar for insertion into the ground during tilling of the ground by the tilling claws to generate resistance forces for countering driving forces generated during rotation of the tilling claws; and a manipulating handle for guiding the tiller and pivotally connected to a rear portion of the power source or to a rear portion of the power transmission mechanism so that shock energy which is generated when the tilling claws strike a hard solid object during tilling of the ground and which is transmitted to the power source or the power transmission mechanism is absorbed by pivotal movement of the power source or the power transmission mechanism relative to the manipulating handle about a pivot point spaced rearwardly from a center of gravity of the small-sized tiller and disposed approximately at the same height as the center of gravity of the small-sized tiller from a surface of the ground.

16. A small-sized tiller comprising: a power source for generating a rotational driving force; a tilling shaft; a power transmission mechanism for transmitting a rotational driving force of the power source to the tilling shaft; a plurality of tilling claws for tilling the ground and connected to the tilling shaft for undergoing rotation therewith; a resistance bar for insertion into the ground during tilling of the ground by the tilling claws to generate resistance forces for countering driving forces generated during rotation of the tilling claws; and a manipulating handle for guiding the tiller and pivotally connected to a rear portion of the power source or to a rear portion of the power transmission mechanism so that shock energy which is generated when the tilling claws strike a hard solid object during tilling of the ground and which is transmitted to the power source or the power transmission mechanism is absorbed by pivotal movement of the power source or the power transmission mechanism relative to the manipulating handle about a pivot point spaced rearwardly from a center of gravity of the small-sized tiller at a distance which is set so that when the tilling claws till the ground while the resistance bar is inserted into the ground, the center of gravity of the small-sized tiller is shifted rearwardly to substantial coincide with the pivot point.

17. A small-sized tiller comprising: a power source for generating a rotational driving force; a tilling shaft; a power transmission mechanism for transmitting a rotational driving force of the power source to the tilling shaft; a plurality of tilling claws for tilling the ground and connected to the tilling shaft for undergoing rotation therewith; a resistance bar for insertion into the ground during tilling of the ground by the tilling claws to generate resistance forces for countering driving forces generated during rotation of the tilling claws; and a manipulating handle directly pivotally connected to the rear portion of the power source or to the rear portion of the power transmission mechanism for guiding the tiller and pivotally connected to a rear portion of the power source or to a rear portion of the power transmission mechanism so that shock energy which is generated when the tilling claws strike a hard solid object during tilling of the ground and which is transmitted to the power source or the power transmission mechanism is absorbed by pivotal movement of the power source or the power transmission mechanism relative to the manipulating handle about a pivot point.

18. A small-sized tiller comprising: a plurality of rotational blades for tilling the ground; a power source for generating a rotational driving force to rotate the rotational blades and for advancing the tiller unidirectionally while tilling the ground; a power transmission mechanism for transmitting the rotational driving force of the power source to the rotational blades; and a handle for guiding the tiller, the handle being pivotally connected to a rear portion of the power source or to a rear portion of the power transmission mechanism so that shock energy which is generated when the rotational blades strike a hard solid object during tilling of the ground and which is transmitted to the power source or the power transmission mechanism is absorbed by pivotal movement of the power source or the power transmission mechanism relative to the handle about a pivot point spaced rearwardly from a center of gravity of the tiller and disposed approximately at the same height as the center of gravity of the tiller from a surface of the ground.

19. A small-sized tiller comprising; a plurality of rotational blades for tilling the ground; a power source for generating a rotational driving force to rotate the rotational blades and for advancing the tiller unidirectionally while tilling the ground; a power transmission mechanism for transmitting the rotational driving force of the power source to the rotational blades; a handle for guiding the tiller, the handle being pivotally connected to a rear portion of the power source or to a rear portion of the power transmission mechanism so that shock energy which is generated when the rotational blades strike a hard solid object during tilling of the ground and which is transmitted to the power source or the power transmission mechanism is absorbed by pivotal movement of the power source or the power transmission mechanism relative to the handle about a pivot point; and a resistance bar insertable into the ground during tilling of the ground by the rotational blades to generate resistance forces for countering driving forces generated during rotation of the rotational blades; wherein the pivot point is spaced rearwardly from a center of gravity of the tiller at a distance which is set so that when the rotational blades till the ground while the resistance bar is inserted into the ground, the center of gravity of the tiller is shifted rearwardly to substantial coincide with the pivot point.

20. A small-sized tiller comprising: a plurality of rotational blades for tilling the ground; a power source for generating a rotational driving force to rotate the rotational blades and for advancing the tiller unidirectionally while tilling the ground; a power transmission mechanism for transmitting the rotational driving force of the power source to the rotational blades; and a handle for guiding the tiller, the handle being directly pivotally connected to a rear portion of the power source or to a rear portion of the power transmission mechanism so that shock energy which is generated when the rotational blades strike a hard solid object during tilling of the ground and which is transmitted to the power source or the power transmission mechanism is absorbed by pivotal movement of the power source or the power transmission mechanism relative to the handle about a pivot point.

* * * * *